(12) United States Patent
Morgan et al.

(10) Patent No.: US 11,297,885 B2
(45) Date of Patent: **\*Apr. 12, 2022**

(54) REFLECTIVE ARTICLES OF WEAR

(71) Applicant: NIKE, Inc., Beaverton, OR (US)

(72) Inventors: Daniel Morgan, Beaverton, OR (US); David Turner, Portland, OR (US)

(73) Assignee: NIKE, Inc., Beaverton, OR (US)

( \* ) Notice: Subject to any disclaimer, the term of this patent is extended or adjusted under 35 U.S.C. 154(b) by 251 days.

This patent is subject to a terminal disclaimer.

(21) Appl. No.: 16/691,153

(22) Filed: Nov. 21, 2019

(65) Prior Publication Data

US 2020/0085117 A1 Mar. 19, 2020

Related U.S. Application Data

(63) Continuation of application No. 15/984,938, filed on May 21, 2017.

(60) Provisional application No. 62/513,050, filed on May 31, 2017, provisional application No. 62/549,810, filed on Aug. 24, 2017.

(51) Int. Cl.

| | | |
|---|---|---|
| *A41D 13/01* | (2006.01) |
| *B29D 28/00* | (2006.01) |
| *A41D 31/06* | (2019.01) |
| *A41D 31/32* | (2019.01) |
| *A41D 31/14* | (2019.01) |
| *B29C 48/00* | (2019.01) |
| *A41D 15/04* | (2006.01) |
| *B29C 48/155* | (2019.01) |
| *A43B 5/00* | (2022.01) |

(52) U.S. Cl.
CPC ............. *A41D 13/01* (2013.01); *A41D 15/04* (2013.01); *A41D 31/065* (2019.02); *A41D 31/14* (2019.02); *A41D 31/32* (2019.02); *B29C 48/022* (2019.02); *B29D 28/00* (2013.01); *A43B 5/00* (2013.01); *B29C 48/155* (2019.02)

(58) Field of Classification Search
CPC ...... A41D 13/01; A41D 31/14; A41D 31/065; A41D 15/04; A43B 5/00; B29C 48/022; B29C 48/155; B29D 28/00
See application file for complete search history.

(56) References Cited

U.S. PATENT DOCUMENTS

| | | |
|---|---|---|
| RE30,892 E | 3/1982 | Bingham et al. |
| 4,994,317 A | 2/1991 | Dugan et al. |

(Continued)

FOREIGN PATENT DOCUMENTS

| | | |
|---|---|---|
| AU | 2011203099 A1 | 1/2012 |
| AU | 2013101656 A4 | 1/2014 |

(Continued)

OTHER PUBLICATIONS

"Forza Jacket," vergesport.com. Accessed: Apr. 1, 2017. http://web.archive.org/web/20170401082938/http://www.vergesport.com/auen/products/retail/forzacollection/forzajacket/.

(Continued)

*Primary Examiner* — Gloria M Hale
(74) *Attorney, Agent, or Firm* — Shook, Hardy & Bacon L.L.P.

(57) ABSTRACT

Reflective articles of wear are disclosed. The reflective articles of wear can include an elastomeric material and reflective components coupled to the elastomeric material. The elastomeric material forms a plurality of apertures.

20 Claims, 27 Drawing Sheets

(56) References Cited

U.S. PATENT DOCUMENTS

| | | | |
|---|---|---|---|
| 5,491,586 A | 2/1996 | Phillips | |
| 5,620,775 A | 4/1997 | Laperre | |
| 5,639,530 A | 6/1997 | Miron et al. | |
| 5,860,163 A | 1/1999 | Aldridge | |
| 6,312,782 B1 | 11/2001 | Goldberg et al. | |
| 6,592,967 B2 | 7/2003 | Kaufman | |
| 6,764,744 B2 | 7/2004 | DeMott et al. | |
| 6,777,356 B2 | 8/2004 | Sadato et al. | |
| 6,820,280 B1 | 11/2004 | Atallah et al. | |
| 7,347,571 B2 | 3/2008 | Bacon, Jr. | |
| 9,155,346 B2 | 10/2015 | Wu | |
| 10,555,565 B2 * | 2/2020 | Morgan | A41D 31/32 |
| 2005/0071907 A1 | 4/2005 | Atallah et al. | |
| 2005/0157389 A1 | 7/2005 | Shipman et al. | |
| 2005/0157390 A1 | 7/2005 | Weiss et al. | |
| 2005/0249926 A1 | 11/2005 | Feduzi et al. | |
| 2006/0000003 A1 | 1/2006 | Grilliot et al. | |
| 2006/0026731 A1 | 2/2006 | Qashou | |
| 2007/0000011 A1 | 1/2007 | Golle et al. | |
| 2008/0043458 A1 | 2/2008 | Desjardin | |
| 2009/0031467 A1 | 2/2009 | Swindells et al. | |
| 2009/0248193 A1 | 10/2009 | Basheer et al. | |
| 2009/0258221 A1 | 10/2009 | Diehl et al. | |
| 2010/0284080 A1 | 11/2010 | Mullen | |
| 2011/0305006 A1 | 12/2011 | Hehenberger | |
| 2012/0002403 A1 | 1/2012 | Winzer et al. | |
| 2012/0151650 A1 | 6/2012 | Sparrer et al. | |
| 2014/0259269 A1 | 9/2014 | Clements | |

FOREIGN PATENT DOCUMENTS

| | | |
|---|---|---|
| CN | 1147859 A | 4/1997 |
| CN | 204462430 U | 7/2015 |
| CN | 204595250 U | 8/2015 |
| DE | 4130961 C2 | 5/2000 |
| GB | 2305848 A | 4/1997 |
| JP | 2002309416 A | 10/2002 |
| JP | 2004184646 A | 7/2004 |
| WO | 9406869 A2 | 3/1994 |
| WO | 2008118955 A1 | 10/2008 |
| WO | 2011/156930 A1 | 12/2011 |
| WO | 2013162294 A1 | 10/2013 |

OTHER PUBLICATIONS

"UA Run True," underarmour.com. Accessed: Apr. 1, 2017. http://web.archive.org/web/20170401084515/https://www.underarmour.com/en-us/pid1290900.

"King Tech," b2bmit.com. Accessed: Apr. 1, 2017 (Jul. 8, 2016 for kingtech2). http://web.archive.org/web/20170401082149/http://www.b2bmit.com/showroomf9049585.htm?sk=Reflective+Fabric.

"Nike Power Speed Flash," store.nike.com. Accessed: Apr. 1, 2017. http://web.archive.org/web/20170401083638/http://store.nike.com/us/en_us/pd/powerspeedflashwomensrunningtights/pid11105983/pgid11860561.

International Preliminary Report on Patentability mailed Dec. 12, 2019 in International Patent Application No. PCT/US2018/034833, 9 pages.

Intention to Grant received for European Patent Application No. 18731710.2, dated Jan. 10, 2022, 7 pages.

* cited by examiner

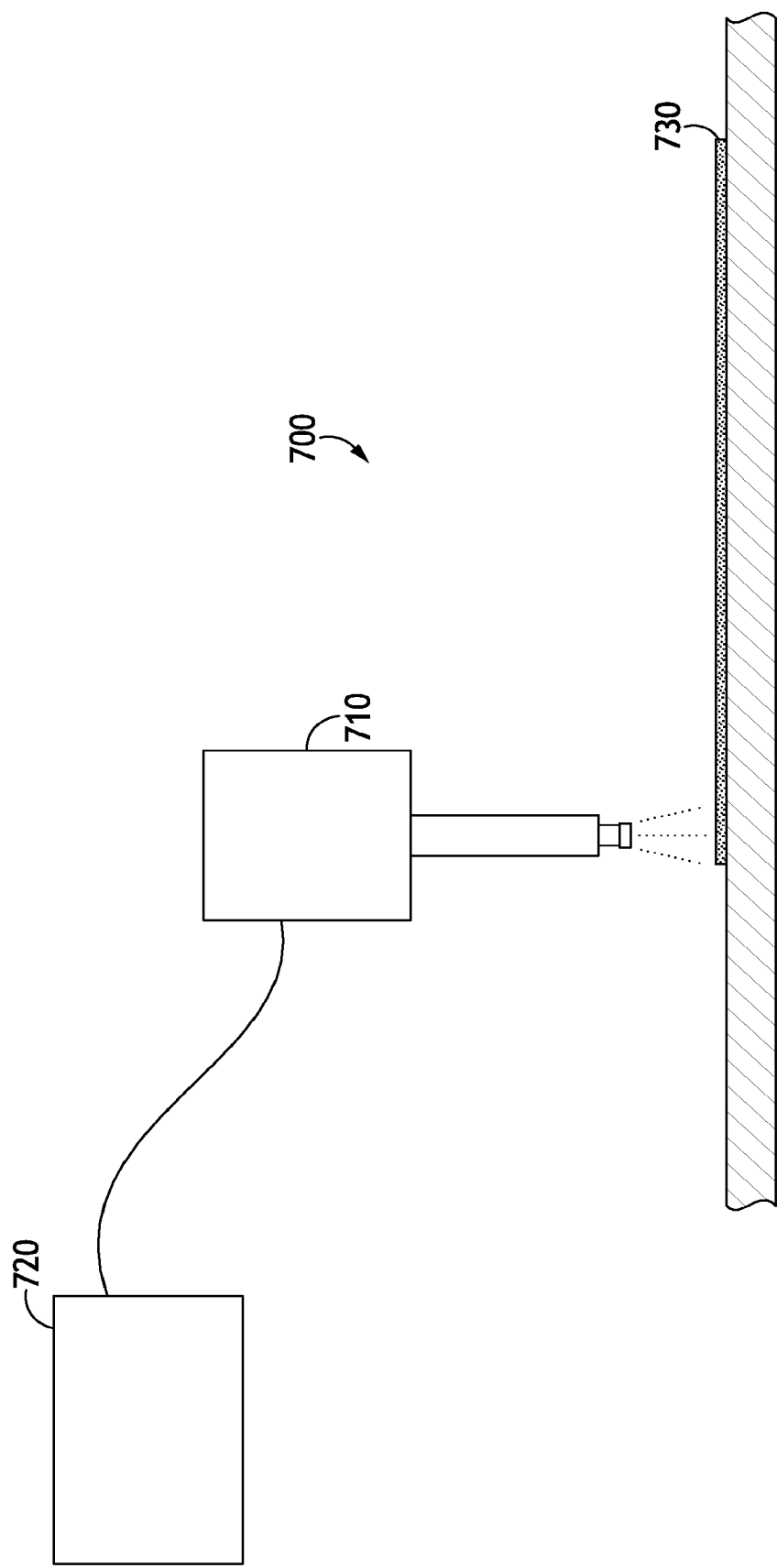

REFLECTIVE ARTICLES OF WEAR

CROSS-REFERENCE TO RELATED APPLICATIONS

This U.S. application Ser. No. 16/691,153, filed on Nov. 21, 2019, entitled "Reflective Articles Of Wear," is a Continuation Application of U.S. application Ser. No. 15/984,938, filed on May 21, 2018, entitled "Reflective Articles Of Wear," which has now issued as U.S. Pat. No. 10,555,565 on Feb. 11, 2020, which claims priority to both U.S. Provisional Application No. 62/513,050, filed on May 31, 2017, entitled "Reflective Articles Of Wear," and U.S. Provisional Application No. 62/549,810, filed on Aug. 24, 2017, entitled "Reflective Articles Of Wear." All of the above referenced applications are herein incorporated by reference in their entireties.

TECHNICAL FIELD

The present disclosure relates to articles of wear. More particularly, the present disclosure relates to reflective articles of wear.

BACKGROUND

Certain articles of wear can include reflective materials to increase the visibility of the wearer. For specific articles of wear, the reflective material may decrease the breathability of the article of wear. In such articles of wear, the reflective material may be limited to small portions of the article to minimize the lack of breathability.

BRIEF DESCRIPTION OF THE DRAWINGS

Illustrative aspects of the present invention are described in detail below with reference to the attached drawing figures, which are incorporated by reference herein and wherein:

FIG. 7A is a schematic and cross-sectional view of a system for forming a plane of retroreflective components, particularly showing an adhesive applicator, an applicator controller, and a cross section of a transfer sheet, in accordance with aspects hereof;

DETAILED DESCRIPTION

Figure 1:
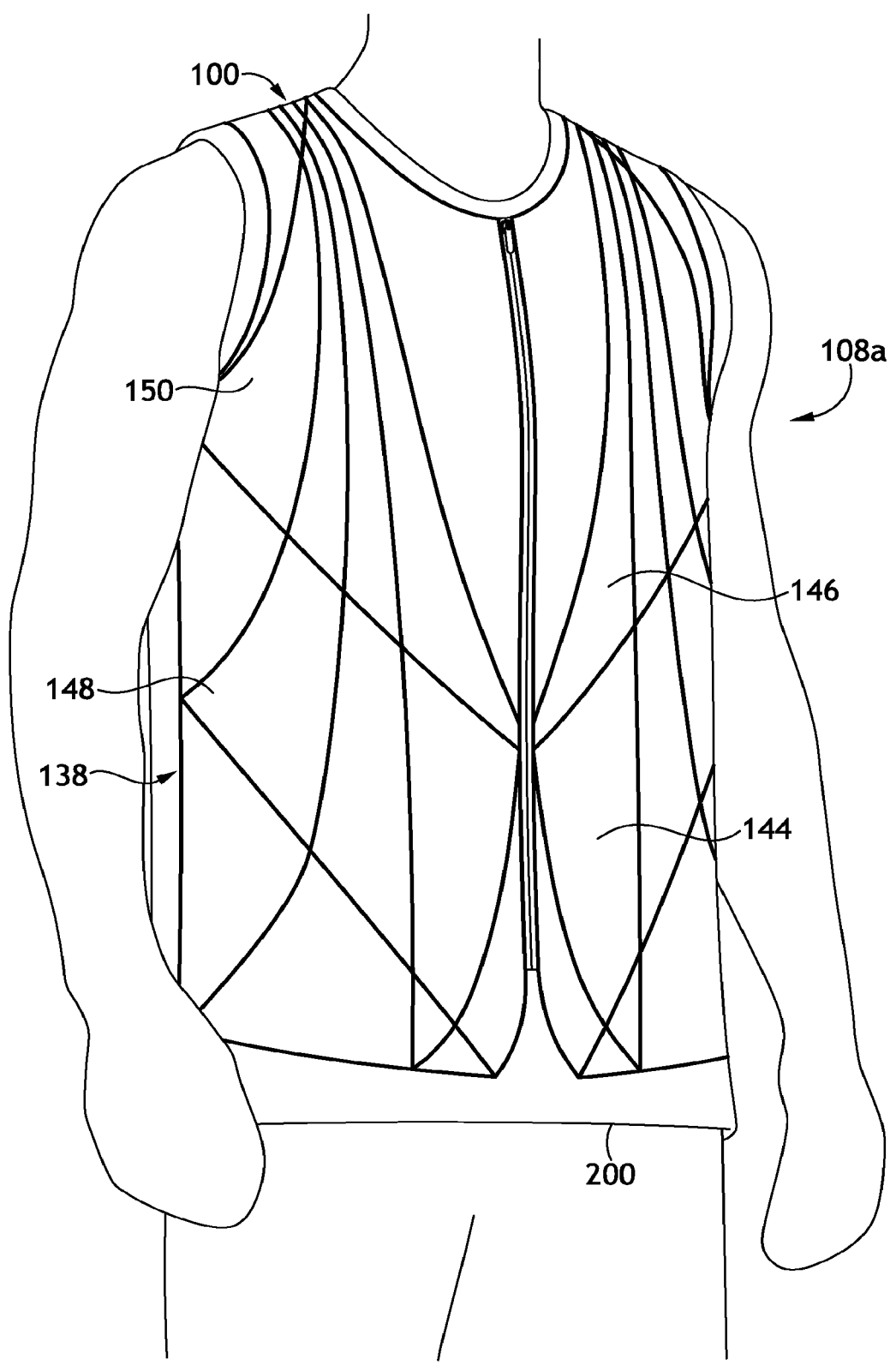
FIG. 1 is a perspective view of a reflective vest positioned over an underlying shirt, particularly showing the front torso-covering portion of the reflective vest, in accordance with aspects hereof.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

In general, aspects herein are directed to lightweight or minimalist reflective articles of wear. As used herein, "articles of wear" refers to: articles of apparel, such as shirts, pants, shorts, socks, jackets, vests, arm or leg sleeves, panels, hats, or other outerwear; equipment articles, such as duffel bags, backpacks, pads, shin guards, or other equipment; and articles of footwear. Certain conventional articles of wear may incorporate reflective materials into the article for increased visibility of the wearer. However, the incorporation of reflective materials into an article of wear can decrease its breathability and/or elasticity. Specific articles of wear may limit the amount of reflective materials incorporated therein in order to minimize any negative effects on breathability and/or elasticity caused by the reflective materials, which can result in an article of wear with only a minor enhancement of visibility. Further, not all articles of apparel include reflective materials, thereby limiting one's choices for apparel when increased visibility is desired.

The reflective articles of wear described herein can alleviate one or more of the problems discussed above. For example, the reflective articles of wear disclosed herein can be worn over existing articles of apparel without adding significant weight or additional covering, thereby increasing visibility in a comfortable and minimalist manner. In aspects, at a high level, the reflective articles of wear disclosed herein can include a plurality of apertures, which contribute to the lightweight and minimalist features of the articles, while also providing enhanced breathability.

In aspects, the reflective articles of wear may be made to easily conform to a wearer's body by comfortably stretching over the wearer's body when worn, or alternatively, the reflective articles of wear may be provided with securing mechanisms that may be adjustable in order to provide a good fit for the user when worn. As well, in certain aspects, the reflective articles of wear may be constructed to have various degrees of grip or "stickiness" at different portions of the reflective articles of wear. For example, in the event that the reflective article of wear is in the form of a reflective vest, the vest portions configured to align with and face the shoulders of a wearer may be made "sticky" in order to provide a gripping surface that will serve to keep the reflective vest from moving or shifting at the shoulders, while other portions of the vest may be less gripping or not gripping at all to allow for natural shifting with the underlying garment, especially when the wearer is engaged in a physical activity such as running, for comfort. The grip may be provided by making certain portions of the garment tackier than others by varying the material used in the different portions of the article of wear, by providing flocking to desired portion of the article of wear where grip is desired, by providing a high friction material such as an adhesive where grip is desired (the adhesive may be applied prior to use, or it may be activatable by washing prior to use).

Further, in certain aspects, the reflective articles of wear disclosed herein can include an elastomeric material, which can stretch and move with a wearer while putting the article of wear on, and while wearing the article of wear. In one or more aspects, one or more reflective components may be coupled to the surface of the elastomeric material or may be mixed in to the elastomeric material resin or liquid prior to curing, to provide increased visibility of the wearer in dark or low light settings. Where reflective components are coupled to the surface of the elastomeric material, the elastomeric properties of the elastomeric material may not disrupt the reflective properties of the reflective components as the elastomeric material stretches and moves. However, when the reflective materials are mixed into the resin or liquid elastomeric material prior to curing, the reflective properties of the reflective components may be varied depending on the depth at which the reflective components are embedded within the elastomeric material once the elastomeric material is cured.

Accordingly, aspects herein are directed to an upper torso reflective garment comprising a webbed structure having a plurality of apertures, wherein the webbed structure is formed from a plurality of intersecting reflective elastomeric strands. The webbed structure comprising a front panel, a back panel, and a pair of shoulder straps that connect the front panel and the back panel. The front panel, the back panel, and the pair of shoulder straps define a neck opening, and a pair of armhole openings. Each aperture in the plurality of apertures comprises a shape having at least a first axis and at least a second axis. The first axis of at least one aperture located on the back panel is oriented orthogonal to a hypothetical vertical axis, and the second axis of the at least one aperture located on the back panel is oriented parallel to the hypothetical vertical axis. The at least one aperture is deformable to a first degree in a direction that is parallel to the first axis and is deformable to a second degree in a direction that is orthogonal to the first axis.

Aspects herein are further directed to a method for manufacturing a reflective article of wear by providing a transfer sheet having a plurality of reflective components temporarily secured to a first surface of the transfer sheet, positioning a second surface of the transfer sheet on a work surface, extruding an elastomeric material onto a portion of the first surface of the transfer sheet in a pattern of interconnected strands to form a webbed structure with a plurality of apertures, curing the elastomeric material forming the webbed structure, and removing the transfer sheet from the webbed structure. The curing causes at least a portion of the plurality of reflective components on the first surface of the transfer sheet to become embedded within the elastomeric material of the webbed structure.

Aspects herein are additionally directed to an elastomeric reflective article of wear comprising a continuous webbed structure having a plurality of apertures, wherein the continuous webbed structure comprises a plurality of intersecting reflective elastomeric strands. The continuous webbed structure forms at least one front panel, a back panel, and a shoulder strap that integrally extends from the at least one front panel and the back panel and which connects the at least one front panel and the back panel. The at least one front panel, the back panel, and the shoulder strap define an armhole opening. At least a first aperture of the plurality of apertures is located on the back panel the first aperture comprising a long axis that is oriented orthogonal to a hypothetical vertical axis and a short axis that is oriented parallel to the hypothetical vertical axis, wherein a first degree of deformation of the first aperture along the short axis is greater than a second degree of deformation along the long axis.

As used herein, the term "reflection" or "reflective" includes retroreflection, specular (or mirror-like) reflection, and/or diffuse reflection. Retroreflection reflects an incident beam of light, e.g., from an automobile headlight, in such a manner that the light is returned to the source even though the incident light strikes the reflecting material associated with the retroreflective component at an angle. Retroreflection differs from diffusing reflection, where a diffusing surface would dissipate light in all directions, and from specular, mirror like reflection that reflects light off the reflective surface at the same angle as the incident beam of light. For ease of use, the term "retroreflective" as used herein refers to retroreflection as described above, while "general reflection" as used herein refers to diffuse and/or specular, mirror-like reflection.

It should be understood that while specific aspects depicted herein include retroreflective components, other types of reflective components can also be utilized, in place of or in addition to the retroreflective components. For example, in one aspect, metallic particles or particles coated with a metallic material can be coupled to an elastomeric material (or embedded within an elastomeric material), to provide general reflection properties to the reflective article of wear.

In certain aspects, the reflective articles of wear disclosed herein can also be one component of a multi-component garment system, where the reflective article of wear may be reversibly secured to an underlying article. In one example, a reflective vest and an underlying shirt may be provided in the multi-component garment system, where each of the reflective vest and the underlying shirt can include complementary reversible fasteners for securing the reflective vest to the underlying shirt. In another example, a reflective panel and an underlying shirt or other type of garment may be provided where the reflective panel and the underlying shirt or other type of garment include reversible fasteners for securing the reflective panel to the underlying shirt or other type of garment. In an example aspect, the reversible fasteners can include one or more magnets or a metallic material for a magnet associated with a component of the garment system to reversibly adhere to. In such aspects, the multi-component garment system allows a wearer to utilize the reflective features of the reflective vest or the reflective panel when needed, and to forgo the reflective vest or the reflective panel and wear the underlying shirt or other type of garment alone when increased visibility is not desired or needed.

In various aspects, one or more light sources, such as one or more light emitting diode (LED) lights, can be coupled to the elastomeric material of the reflective articles of wear disclosed herein in order to provide a further enhancement of visibility. In such aspects, as discussed further below, one or more LED lights can be embedded or otherwise provided into or on the elastomeric material during the formation of the reflective articles of wear.

Accordingly, in one aspect, an article of wear is provided. The article of wear comprises an elastomeric material. At least a portion of the elastomeric material forms a plurality of intersecting strands. Each strand of the plurality of intersecting strands has a length and has a width, where the width is less than the length, and where the width is less than about 10 cm. The plurality of intersecting strands includes a first surface and second surface. The article of wear further includes reflective components coupled to the second surface of at least a portion of the plurality of intersecting strands. The article of wear also includes one or more apertures defined by the at least a portion of the plurality of intersecting strands.

In another aspect, an article of apparel is provided. The article of apparel comprises a neck opening; one or more arm openings; and a torso-covering portion configured to cover the torso of a wearer when the article of apparel is appropriately sized for the wearer and when the article of apparel is worn as intended by the wearer standing in an upright position. The article of wear further includes a plurality of apertures. At least a portion of the plurality of apertures are present in the torso-covering portion. Each of the plurality of apertures is defined by one or more reflective elastomeric strands. Each reflective elastomeric strand of the one or more reflective elastomeric strands includes an elastomeric material and a reflective component coupled to the elastomeric material. Each reflective elastomeric strand of the one or more reflective elastomeric strands has a length and has a width, where the width is less than the length, and where the width is less than about 10 cm.

In yet another aspect, a sleeveless upper body garment is provided. The sleeveless upper body garment includes a neck opening; one or more arm openings; and a torso-covering portion. The torso-covering portion includes a plurality of apertures. Each of the neck opening, the one or more arm openings, and the torso-covering portion are at least partly formed from a reflective elastomeric material. The reflective elastomeric material includes an elastomeric material and a reflective component coupled to the elastomeric material.

Figure 2:
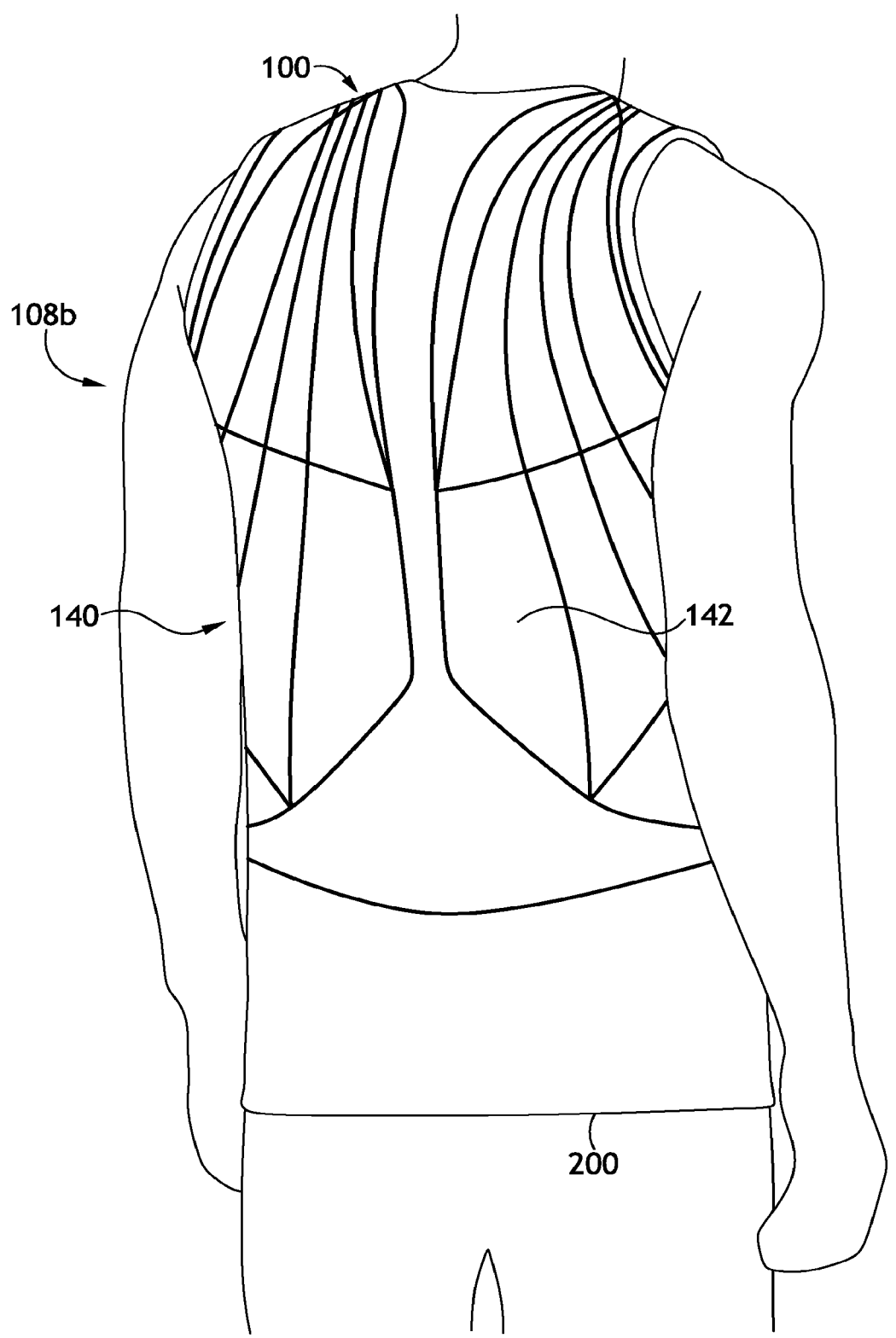
FIG. 2 is a perspective view of the reflective vest of FIG. 1, particularly showing the back torso-covering portion of the reflective vest, in accordance with aspects hereof.
Figure 3:
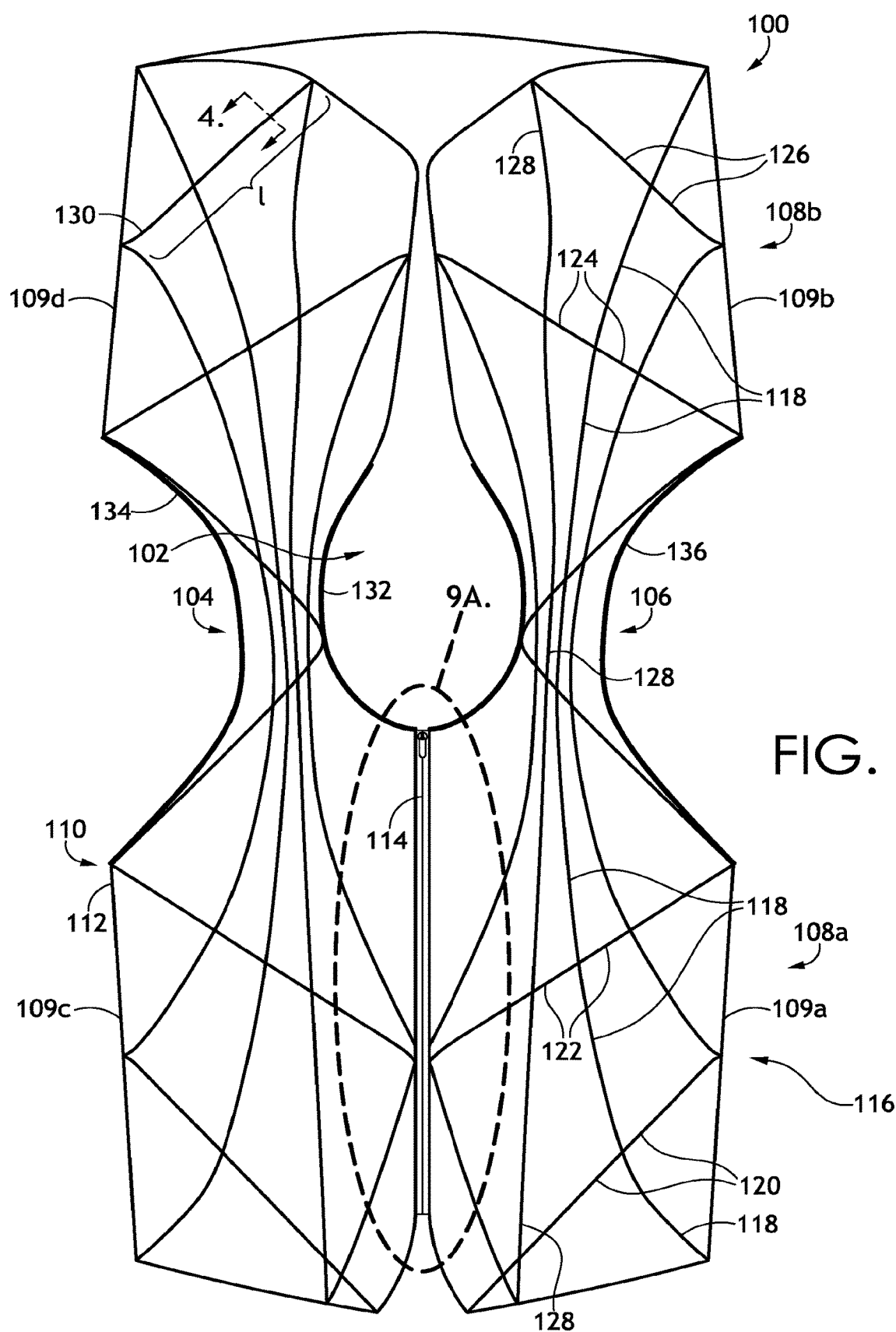
FIG. 3 is a plan view of the reflective vest of FIG. 1 in the absence of the underlying shirt, in accordance with aspects hereof.

Turning now to the figures and FIGS. 1-3 in particular, a reflective vest 100 is depicted. FIGS. 1 and 2 depict the reflective vest 100 positioned over an underlying article, a shirt 200. FIG. 3 depicts the reflective vest 100 in isolation and lay flat to better illustrate various aspects discussed below. It should be understood that the reflective vest 100 is just one example of a reflective article of wear and other types of reflective articles of wear are contemplated by the present disclosure. It should also be understood that, in certain aspects, the reflective vest 100, and other reflective articles of wear disclosed herein, can be worn in the absence of an underlying article.

As best seen in FIG. 3, the reflective vest 100 includes a neck opening 102, arm openings 104 and 106, a front torso-covering portion 108a, a back torso-covering portion 108b, and an elastomeric material 110. As discussed further below, one or more reflective components, such as one or more retroreflective components 112, can be coupled to the elastomeric material 110. Reflective components and retroreflective components are discussed in detail below.

In aspects, the elastomeric material 110 can include any commercially available elastomeric material. In one aspect, the elastomeric material 110 can include a silicone or silicone rubber material. In certain aspects, the elastomeric material can be a thermoset material. In alternative aspects, the elastomeric material can be a thermoplastic material such as thermoplastic polyurethane (TPU), polyurethane (PU), and the like. In yet additional aspects, the elastomeric material may be comprised of more than one different type of elastomeric material. In other words in some articles of wear, a second layer of a second type of elastomeric material may be printed or otherwise deposited on top of a first layer of a first type of elastomeric material. For example, in one aspect, a first layer of a first material (e.g., PU) may be screen printed or 3D printed on a transfer sheet having a plurality of reflective components, then a second layer of a second material (e.g. silicone) may be printed or otherwise deposited on top of the first layer or on top of the plurality of reflective components, depending on whether the reflective components are desired on the surface of or within the elastomeric strands forming the article of wear. The deposition of the elastomeric material is discussed further below.

In an aspect not depicted in FIG. 3, the reflective vest 100 can include one or more reversible fasteners to adhere or removably couple the front torso-covering portion 108a to the back torso-covering portion 108b. For example, one or more reversible fasteners can be coupled to the left edge 109a of the front torso-covering portion 108a, and one or more complementary reversible fasteners can be coupled to the left edge 109b of the back torso-covering portion 108b. Further, one or more reversible fasteners can be coupled to the right edge 109c of the front torso-covering portion 108a, and one or more complementary reversible fasteners can be coupled to the right edge 109d of the back torso-covering portion 108b. In such aspects, the edges 109a and 109b can be temporarily fastened or removably coupled together, along with the temporary fastening of the edges 109c and 109d, which can result in the reflective vest 100 wrapping around the torso of the wearer, e.g., covering the front, back, and side torso regions of a wearer when the reflective vest 100 is donned. The reversible fasteners can be any type of conventional reversible fasteners, such as magnets, snaps, buttons, hook and loop fasteners, and the like. In certain aspects, a wearer can place the reflective vest 100 over their head and then fasten the edges 109a and 109b together (and 109c and 109d together) to provide a secure fit and provide increased visibility from all directions. In another aspect, the edges 109a and 109c may be permanently fastened together to edges 109b and 109d, respectively, by for example, stitching, thermal bonding, adhesive bonding, and the like.

The reflective vest 100 can optionally include a slider mechanism 114, such as a zipper, e.g., in the front torso-covering portion 108a. As discussed further below, the slider mechanism 114 can be coupled to the elastomeric material 110 during the formation of the reflective vest 100.

In certain aspects, such as that depicted in FIG. 3, the reflective vest 100 can include a plurality of intersecting strands 116. For example, as best seen in FIG. 3, the reflective vest 100 includes a strand 118 that extends generally linearly or as an arc from the front torso-covering portion 108a to the back torso-covering portion 108b, and that intersects with at least the strands 120, 122, 124, and 126. Further, FIG. 3 includes a strand 128 that also extends generally linearly or as an arc from the front torso-covering portion 108a to the back torso-covering portion 108b and intersects with at least the strands 120, 122, 124, and 126. As discussed further below, in various aspects, one or more of the plurality of intersecting strands 116 can include the elastomeric material 110 and one or more retroreflective components 112.

In aspects, at least a portion of, or all of, the strands within the plurality of intersecting strands 116 can have a length and a width, where the length is greater than the width. For example, as can be seen in the reflective vest 100 of FIG. 3 and the cross section of a strand 130 of the reflective vest 100 of FIG. 4, the strand 130 has a length 1, and a width w that is less than the length 1, where the width w extends transverse to the direction of extension of the length 1. In certain aspects, the strand 130 or any strand of the plurality of intersecting strands 116 can have a width w that is less than about 10 centimeters (cm), less than about 5 cm, or less than about 3 cm.

In various aspects, for increased structural support, it may be desirable for one or more strands, or one or more portions of the elastomeric material of a reflective article wear, to be thicker, or have a greater width w, in certain areas of the article relative to other areas. For instance, thicker strands may be desired in the shoulder region of the reflective vest 100 as opposed to other portions of the reflective vest 100 for strength, without compromising the lightweight nature of the reflective vest 100. Further, as depicted in the reflective vest 100 of FIG. 3, the portion of the elastomeric material or strand 132 at least partly defining the neck opening 102 can have an increased width w relative to the width w of other strands, e.g., the strands 118 or 130. In the same or alternative aspects, the portions of the elastomeric material or strands 134 and 136 at least partly defining the arm openings 104 and 106, respectively, can have an increased width w relative to the width w of other strands, e.g., the strands 118 or 130.

In various aspects, for increased structural support, the reflective vest 100 can include different density of strands in various areas to provide structural support. For example, in the reflective vest 100, there is an increase density of strands in the shoulder region, e.g., the area between the neck opening 102 and the arm openings 104 and 106, as compared to the density of strands in the area between the strands 122 and 120. As used herein the density of strands refers to the number of strands per unit area of the article or wear.

In further aspects, the thickness of the elastomeric material or strands may be increased in areas of an article where increased structural support is desired, e.g., in a shoulder region or a collar region of a vest. The thickness referred to herein is the dimension of the elastomeric material that is transverse to the width of the material discussed above with reference to the strand 130 of the vest 100 of FIG. 1. Methods of altering the thickness of the strands and elastomeric material are discussed in detail below.

Figure 21:
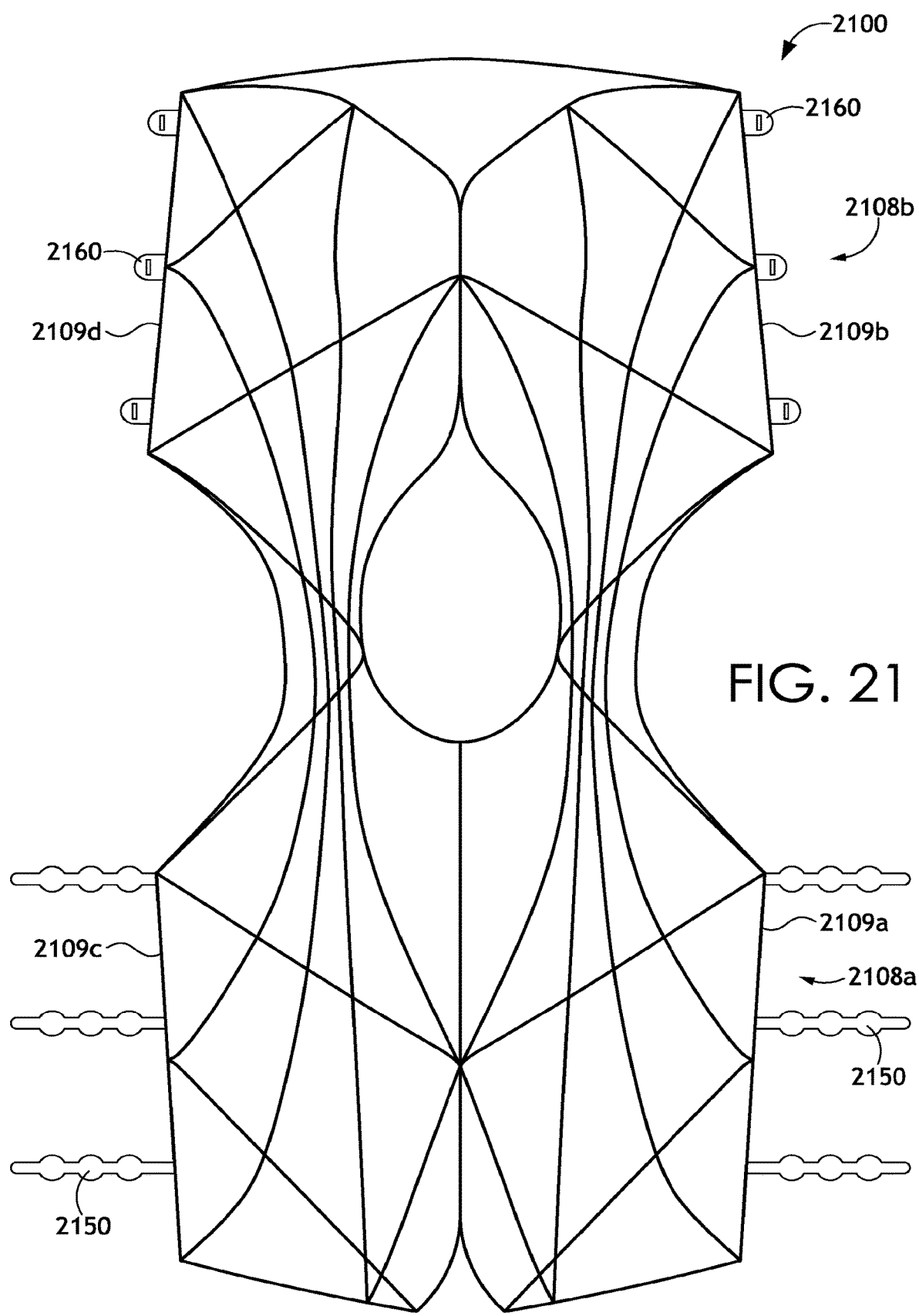
FIG. 21 is a plan view of a reflective vest having reversible fasteners, in accordance with aspects hereof.
Figure 22:
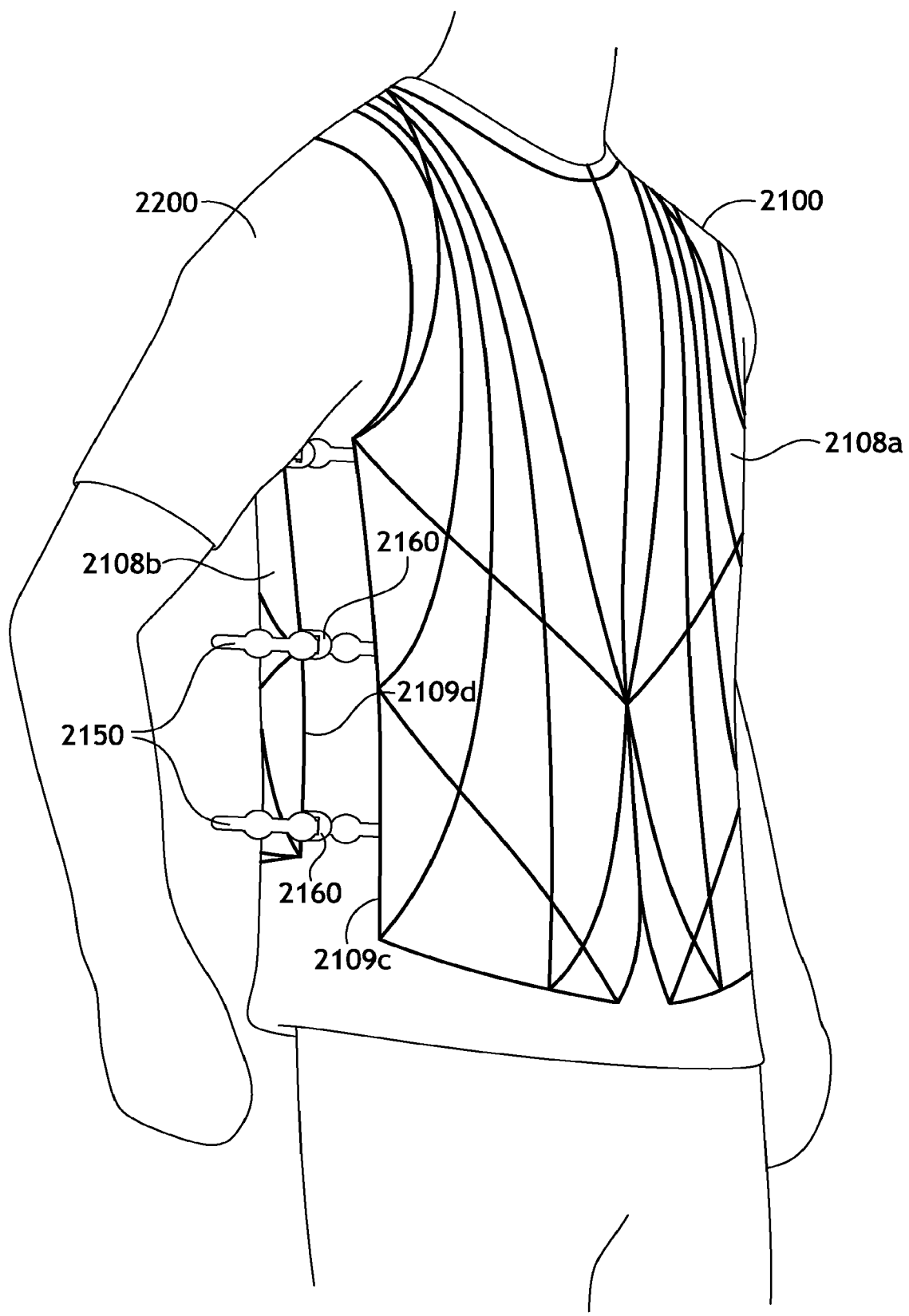
FIG. 22 is a perspective view of the reflective article of wear in FIG. 21 positioned over an underlying shirt when in an as-worn configuration, particularly showing the front and side torso-covering portion of the reflective article of wear, in accordance with aspects hereof.

As described above and as shown in FIG. 21, the reflective articles of wear disclosed herein, such as the reflective vest 2100, can include one or more reversible fasteners to adhere or removably couple the front torso-covering portion or front panel 2108a to the back torso-covering portion or back panel 2108b. For example, one or more reversible fasteners 2150 can be coupled to the left edge 2109a of the front torso-covering portion or front panel 2108a, and one or more complementary reversible fasteners 2160 can be coupled to the left edge 2109b of the back torso-covering portion or back panel 2108b. Further, one or more reversible fasteners 2150 can be coupled to the right edge 2109c of the front torso-covering portion or front panel 2108a, and one or more complementary reversible fasteners 2160 can be coupled to the right edge 2109d of the back torso-covering portion or back panel 2108b. In such aspects, the edges 2109a and 2109b can be temporarily fastened or removably coupled together, along with the temporary fastening of the edges 2109c and 2109d, which can result in the reflective vest 2100 wrapping around the torso of the wearer, e.g., covering the front, back, and side torso regions of a wearer when the reflective vest 2100 is donned. The reversible fasteners 2150 and complementary reversible fasteners 2160 can be locking strips having different locking levels with a complementary lock portion (as shown), or may also be any type of conventional reversible fasteners, such as magnets, snaps, buttons, hook and loop fasteners, and the like. As shown in FIG. 22, in certain aspects, a wearer 2200 can place the reflective vest 2100 over their head and then fasten the edges 2109a and 2109b together (and 2109c and 2109d together) via the reversible fasteners 2150 and 2160 to provide a secure fit and provide increased visibility from all directions.

As discussed above, in certain aspects, the articles of wear described herein can be lightweight or minimalist articles that can provide increased visibility of the wearer. In such aspects, these articles of wear can also have a high level of breathability to minimize or prevent overheating of a wearer. In one or more aspects, such articles of wear can have a plurality of apertures to provide enhanced breathability and/or permeability and to provide a lightweight and minimalist article of wear. For example, as best seen in the reflective vest 100 of FIG. 1, the reflective vest 100 includes a plurality of apertures 138 through which, for instance, the shirt 200 may be visible. In such aspects, the plurality of apertures 138 can be present in a torso-covering portion, e.g., the front torso-covering portion 108a of the reflective vest 100. In the same or alternative aspects, as can be seen in FIG. 2, the back torso-covering portion 108b of the reflective vest 100 can include a plurality of apertures 140, through which the shirt 200 may also be visible.

In certain aspects, at least a portion of the apertures in the reflective vest 100 can be larger than apertures of those in mesh materials found in conventional articles of apparel. For example, in certain aspects as best seen in FIG. 2, one or more apertures, such as the aperture 142 of the reflective vest 100 can have a maximum opening that is about 1 cm or greater, about 3 cm or greater, or about 5 cm or greater. As used herein, a maximum opening of an aperture refers to the larger of the maximum length or maximum width of the aperture. In certain aspects the reflective vest 100 includes several apertures having such a maximum opening, such as the apertures 144, 146, 148, and 150 on the front torso-covering portion 108a, as best seen in FIG. 1. In various aspects, the reflective vest 100 or other reflective articles of wear disclosed herein can be described as having a reflective webbed structure, e.g., thin strands of an elastomeric retroreflective material forming a plurality of apertures and forming the structural components of the reflective vest 100, such as the neck opening 102 and the arm openings 104 and 106. Moreover, in aspects, the reflective webbed structure may comprise a plurality of variably sized and/or irregularly shaped apertures. Any and all aspects, and any variation thereof, are contemplated as being within aspects herein.

Figure 4:
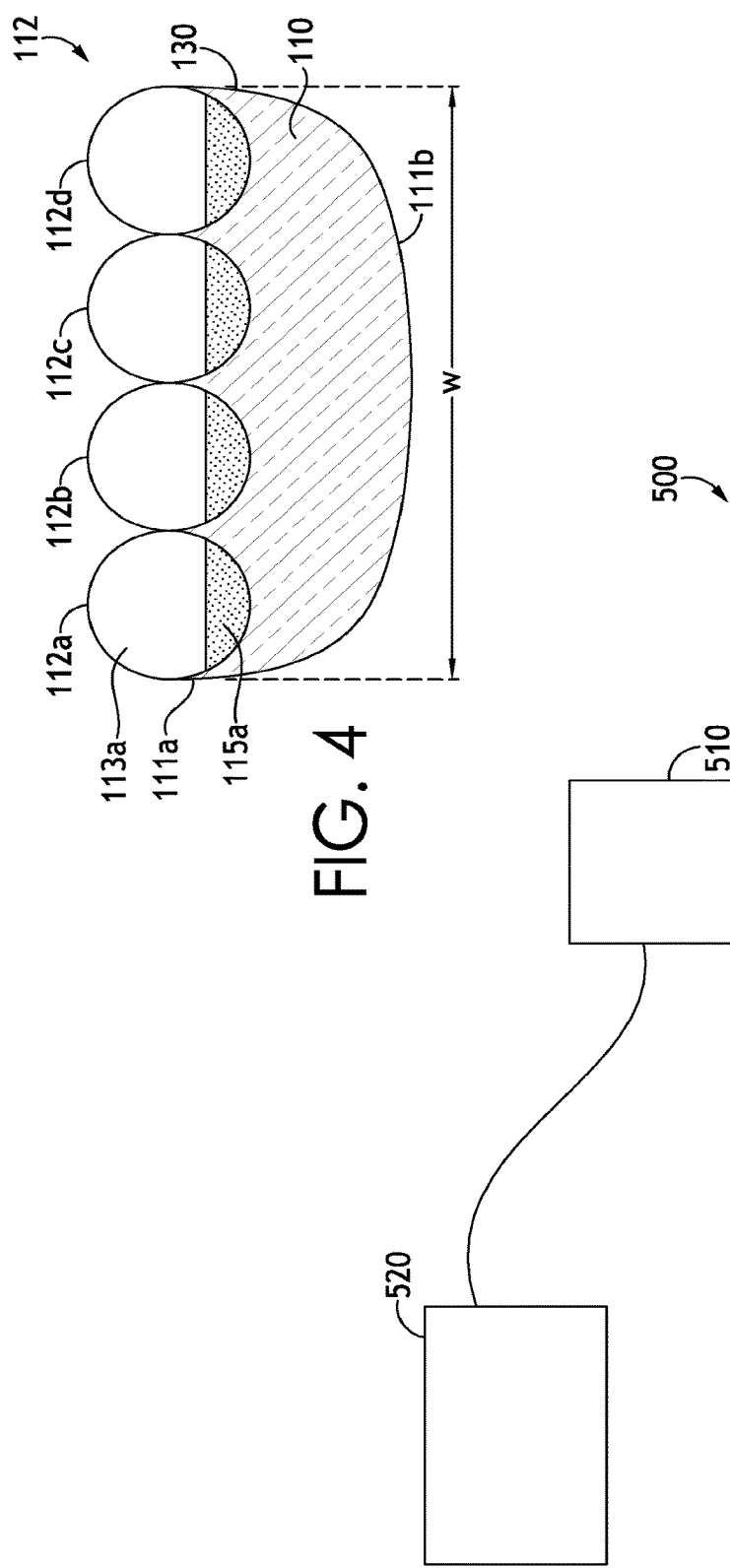
FIG. 4 is a cross section of the reflective vest of FIG. 3 along the cutline 4, particularly showing retroreflective components coupled to an elastomeric material, in accordance with aspects hereof.

Turning back to the figures, FIG. 4 depicts individual retroreflective components 112a, 112b, 112c, and 112d of the one or more retroreflective components 112. In aspects, the retroreflective components 112a, 112b, 112c, and 112d are coupled to the elastomeric material 110 by being at least partly embedded within a first side 111a of the elastomeric material 110. In certain aspects, the retroreflective components 112a, 112b, 112c, and 112d can be any type of retroreflective components that are available (commercially or otherwise). It should be understood that the cross sectional view depicted in FIG. 4 is a schematic depiction of the cross section of the strand 130 of the reflective vest 100 of FIG. 3 in order to highlight specific features of the retroreflective components 112a-112d and the elastomeric material 110. FIG. 4 is not meant to depict the size of the individual retroreflective components 112a-112d relative to the width and to the thickness of the elastomeric material 110.

In aspects, the retroreflective components 112 can include individual glass beads with a reflective material applied to one side of the beads. For example, the retroreflective component 112a includes a glass bead 113a having a reflective material 115a on one side of the glass bead 113a. As can be seen in FIG. 4, the reflective material 115a is in contact with the first side 111a of the elastomeric material 110. In such aspects, when the reflective vest 100 is positioned on a wearer in an as-worn position a second side 111b of the elastomeric material 110 would be facing towards the wearer while the first side 111a of the elastomeric material 110, and thus, the retroreflective components 112a, 112b, 112c, and 112d would be facing away from the wearer.

As discussed above, in aspects, the elastomeric material 110 can stretch to provide more comfort for the wearer and to allow for ease of donning and doffing. In certain aspects, by having the retroreflective components 112 comprised of individual retroreflective components, e.g., 112a-112d, as the elastomeric material 110 stretches or bends, the individual retroreflective components 112a-112d can also bend or stretch (e.g., stretch apart from one another) as the elastomeric material 110 bends or stretches, thereby allowing the retroreflective elastomeric material or strands, e.g., the strand 130, to maintain its integrity and function.

Figure 5:
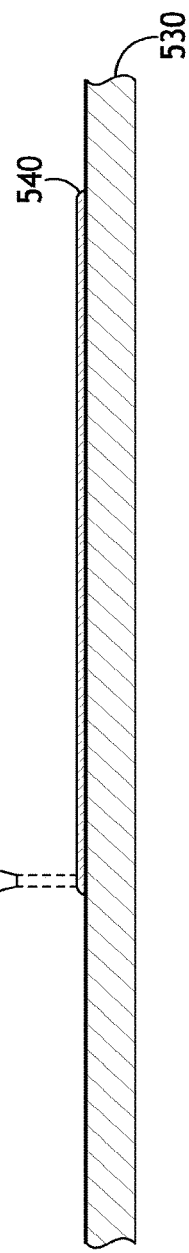
FIG. 5 is a schematic and cross-sectional view of a system for forming reflective articles of wear, particularly showing an extruder, an extruder controller, a cross section of a heated surface, and a cross section of a plane of retroreflective components, in accordance with aspects hereof.

Turning now to FIG. 5, a system 500 for forming reflective articles of wear is depicted. The system 500 can include an extruder 510, an extruder controller 520, and optionally a heated surface 530 for facilitating the curing of the elastomeric material. In aspects, the extruder 510 is adapted to extrude the elastomeric material onto a plane of retroreflective components 540. In one or more aspects, the extruder controller 520 can include a computer system for controller the rate of extrusion of the elastomeric material and/or for controlling the movement of the extruder 510 so that the elastomeric material is deposited onto the plane of retroreflective components 540 in the desired pattern. In aspects, the extruder 510 can extrude elastomeric material onto the plane of retroreflective components 540 at varying speeds and/or at varying rates of extrusion in order to provide the desired thickness or width w of the extruded strands or elastomeric material. In an alternative aspect, the extruder 510 can stay in a fixed position and the plane of retroreflective components 540 and/or the heated surface 530 can move so that the elastomeric material is deposited in the desired shape.

In various aspects, the thickness of the elastomeric material may be varied by applying different number of layers to different portions of the desired shape, where more layers applied may result in a thicker strand. The thickness may also be varied by varying the elastomeric material's viscosity or density when applying to different portions of the desired pattern. As well, extrusion time may also affect the thickness of the extruded product with faster extrusion times providing thinner elastomeric strands and slower extrusion times providing thicker elastomeric strands.

In certain aspects not depicted in the figures, the elastomeric material may be applied to a surface, e.g., the heated surface 530, as opposed to the plane of retroreflective components 540, in aspects where the reflective component is desired to be added after deposition of the elastomeric material. In another aspect, the elastomeric material can be applied to a plane of reflective components that are adapted to provide general reflection.

In some aspects, it is also contemplated that the elastomeric material may be applied as a hot melt onto a desired fabric piece, such as, for example, a performance fabric that is fast drying and has moisture management properties, in a desired pattern. Then, the reflective and/or retroreflective materials in accordance with aspects herein may be applied to the hot melt prior to curing so that the reflective and/or retroreflective components become trapped on and/or embedded in the surface of the hot melt. Once cured, the pattern may be laser cut, or otherwise cut out from the fabric piece to provide an article of wear in accordance with aspects herein, having a comfortable fabric feel on the surface configured to face the wearer when the article of wear is worn. Alternatively, the reflective and/or retroreflective materials may be pre-mixed or suspended into the hot melt prior to applying to the fabric piece. Other systems that may be used for producing the reflective articles of wear disclosed herein include, for example, screen printing, 3D printing, enamel method, and the like, useful for depositing an elastomeric material onto a surface for producing a desired pattern formed from the elastomeric material.

Figure 6A:
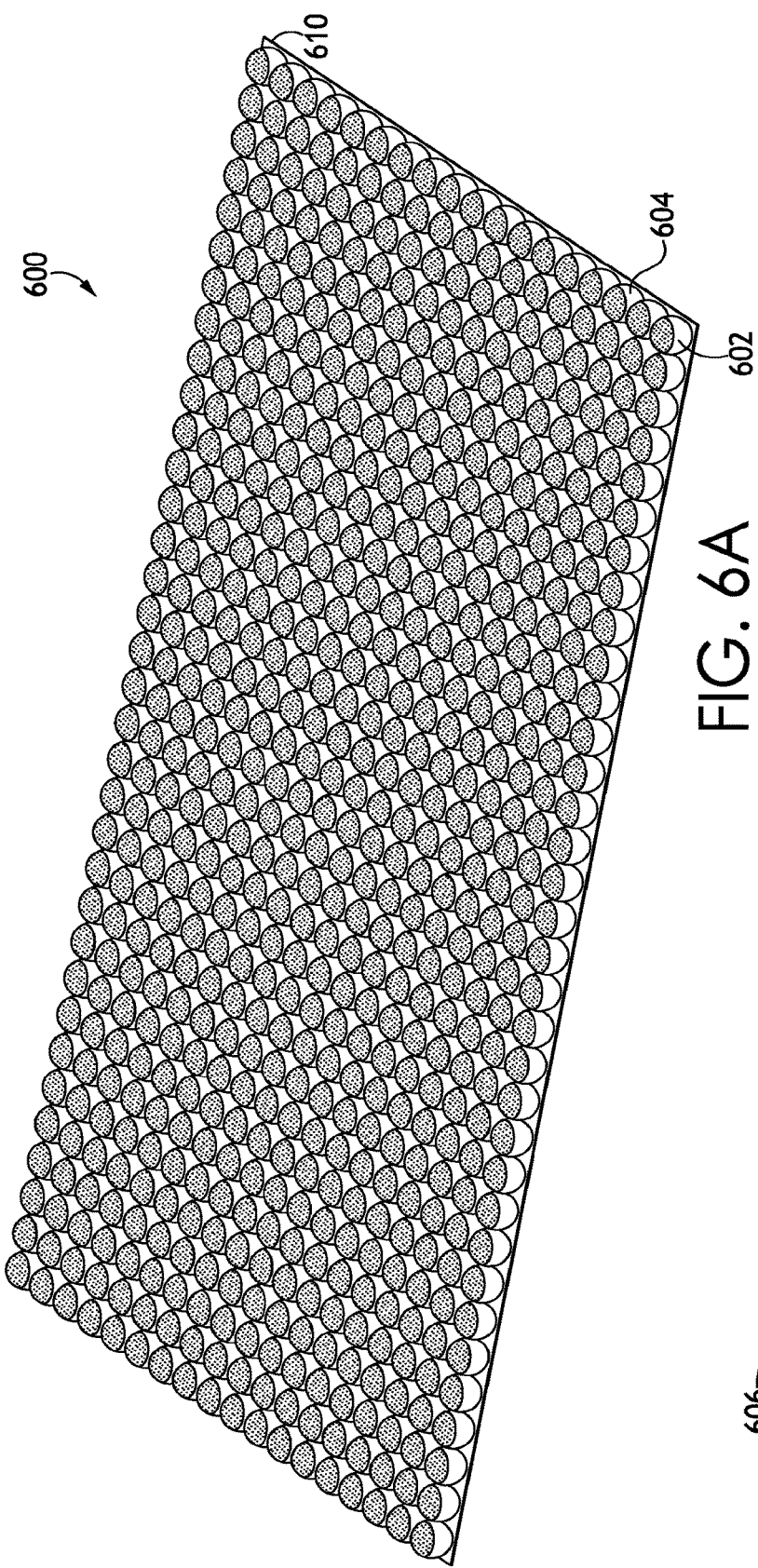
FIG. 6A is a schematic perspective view of a plane of retroreflective components, in accordance with aspects hereof.
Figure 6B:
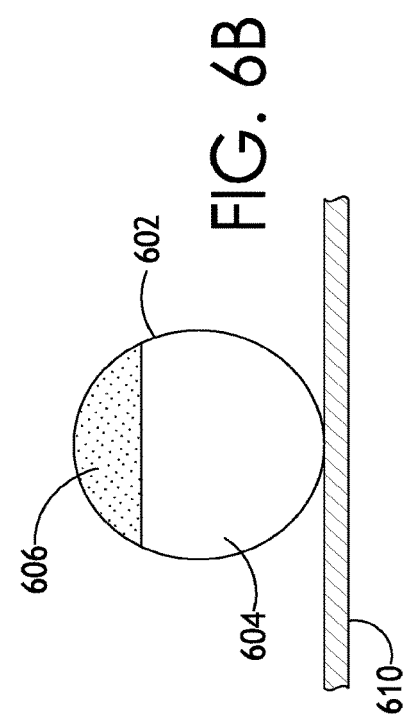
FIG. 6B is a schematic side view of a single retroreflective component positioned on the transfer sheet of the plane of retroreflective components of FIG. 6A, in accordance with aspects hereof.

Returning now to the figures, FIG. 6A depicts one example of a plane of retroreflective components 600. As can be seen in FIG. 6A, the plane of retroreflective components 600 includes a plurality of individual retroreflective components, e.g., retroreflective component 602, coupled to a transfer sheet 610. FIG. 6B depicts a schematic close up view of one retroreflective component 602 from the plane of retroreflective components 600. In the aspect depicted in FIG. 6B, the retroreflective component 602 includes a glass bead 604 with a reflective material 606 positioned on an outer surface of the glass bead 604, on the side of the glass bead 604 that is opposite the side in contact with the transfer sheet 610. As can be seen in FIG. 6A, each of the individual retroreflective components is similarly positioned relative to the transfer sheet, e.g., the reflective material on each of the individual beads is on the side of the beads that is opposite to the side that is in contact with the transfer sheet 610. In one or more aspects, the individual retroreflective components can be temporarily coupled to the transfer sheet 610, e.g., using an adhesive.

In aspects, the plane of retroreflective components 600 can be prepared by applying an adhesive to a transfer sheet, applying loose glass beads to the adhesive covered transfer sheet, and applying a reflective material to approximately the top half of the outward facing portion of the glass beads. In one aspect, the reflective material can be a metallic paint that is applied to the glass beads. In an alternative aspect, the reflective material can be a vaporized metal, such as a vaporized aluminum.

In aspects, the plane of retroreflective components 600 described above includes a large portion of retroreflective components that may not get utilized in a final article of wear, as the plane of retroreflective components 600 is essentially used as a medium or substrate for extruding or printing the elastomeric material thereon. Accordingly, in one or more aspects, in order to minimize the amount of unused retroreflective components, one can optionally produce a plane of retroreflective components where the retroreflective components are applied to a transfer sheet in shape of the desired article of wear.

Figure 7B:
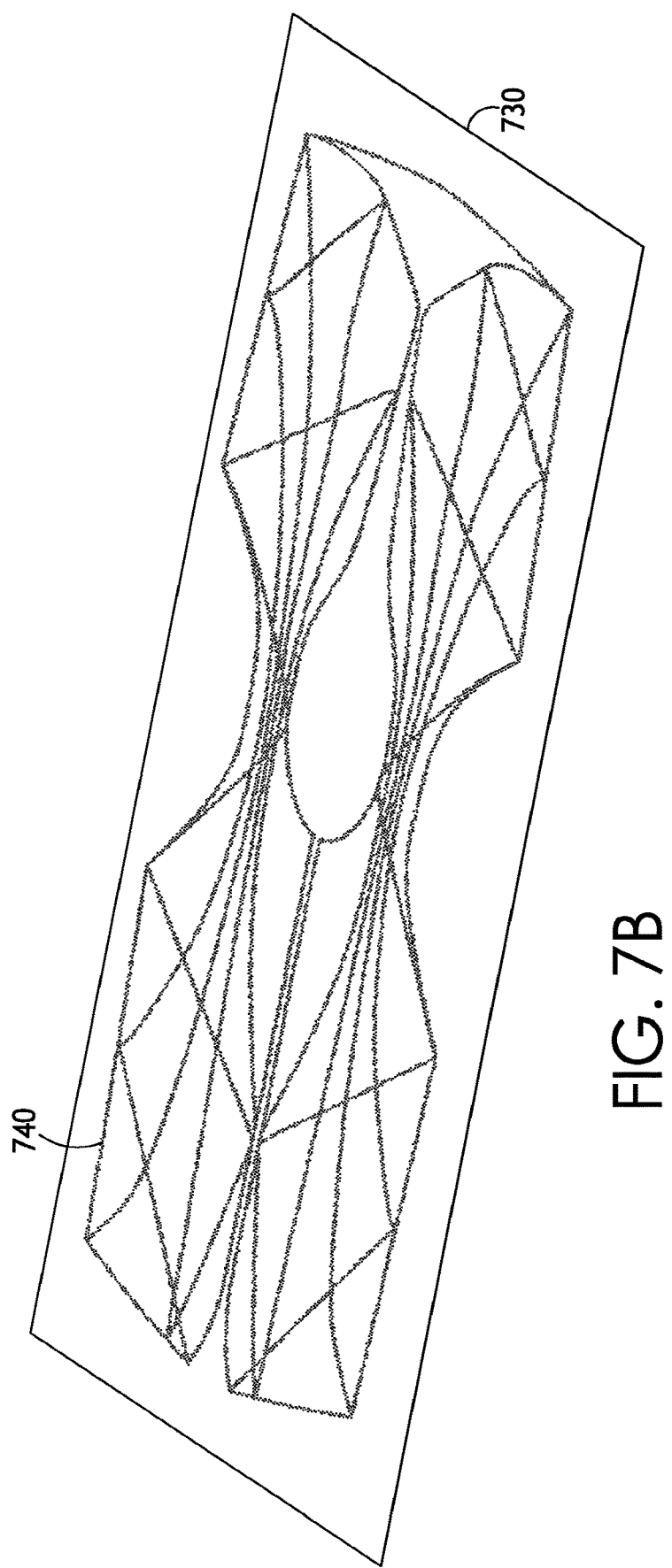
FIG. 7B is a perspective view of the transfer sheet of FIG. 7A, particularly showing a pattern of adhesive applied to the transfer sheet, in accordance with aspects hereof.

FIG. 7A depicts a system 700 for forming a plane of retroreflective components. In aspects, the system 700 can be utilized to form a minimal plane of retroreflective components, e.g., a plane comprising retroreflective components in a final pattern that is desired of the final reflective article of wear, in order to minimize the amount of unused retroreflective components when forming the reflective articles of wear disclosed herein. The system 700 includes an adhesive applicator 710 and an applicator controller 720. In aspects, the adhesive applicator 710 can apply an adhesive to a transfer sheet 730 in the form or shape of the desired article of wear, e.g., in the form or shape that the elastomeric material is going to be applied. In such aspects, once the adhesive is applied to the transfer sheet 730, glass beads can be applied to the transfer sheet 730 and a portion will adhere to the adhesive while the rest of the glass beads can be removed. Further, in such aspects, once the loose glass beads are removed, a reflective material can be applied to one side of the glass beads adhered to the adhesive. The reflective material can be applied to the side of the glass beads opposite the side that is adhered to the transfer sheet 730. FIG. 7B depicts a plane of retroreflective components 740 on the transfer sheet 730 in the shape or form of the desired article of wear. In aspects, this plane of retroreflective components 740 on the transfer sheet 730 can be utilized in the system 500 described above with reference to FIG. 5, for application of the elastomeric material.

Figure 8A:
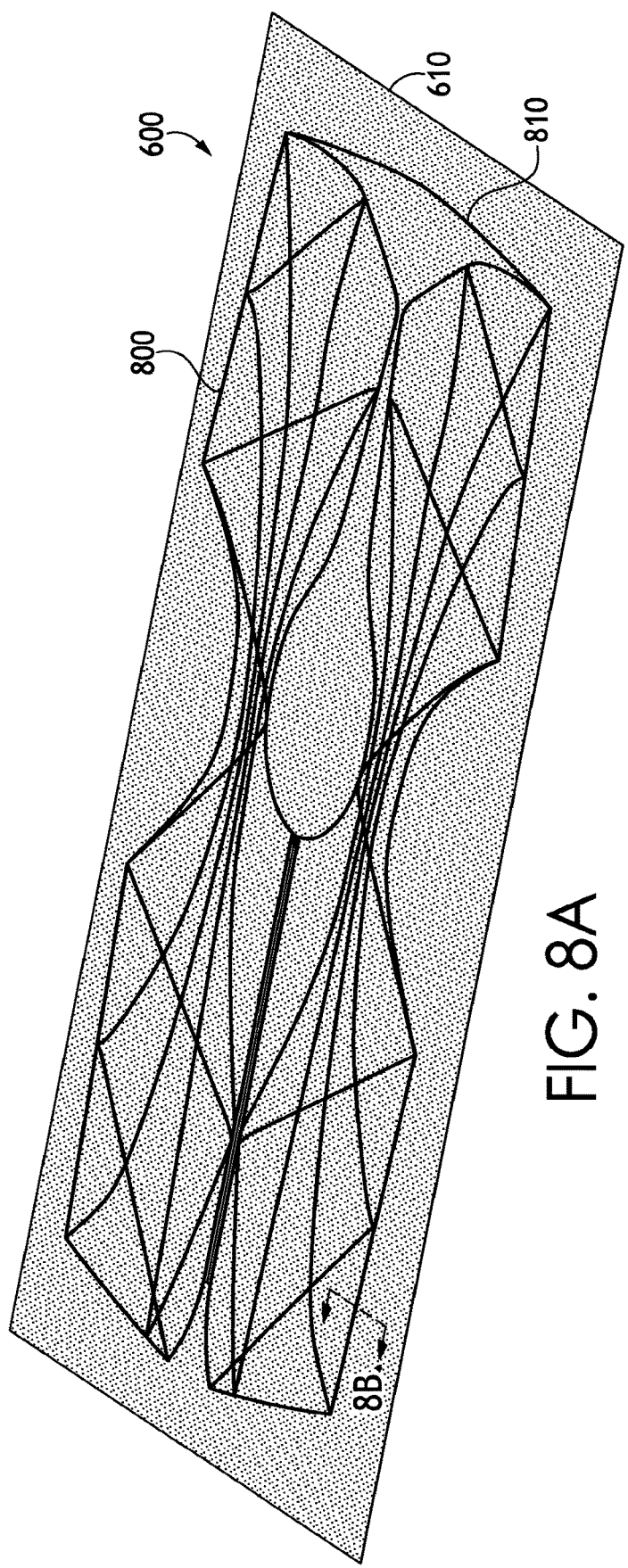
FIG. 8A is a perspective view of a plane of retroreflective components having an extruded elastomeric material positioned on top thereof, in accordance with aspects hereof.

FIG. 8A depicts an elastomeric material 810 extruded onto the plane of retroreflective components 600, with the elastomeric material 810 in the pattern of the reflective vest 800. In the aspect depicted in FIG. 8A, the plane of retroreflective components 600 is coupled to an underlying transfer sheet 610. In aspects, the elastomeric material 810 can be extruded onto the plane of retroreflective components 600 utilizing the system 500 discussed above with reference to FIG. 5.

Figure 8C:
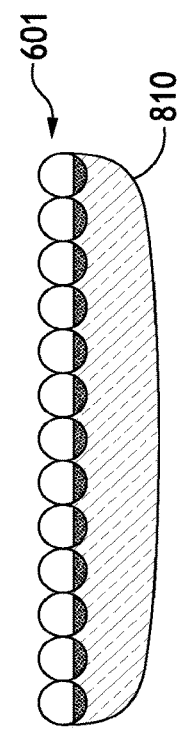
FIG. 8C is a schematic and cross-sectional view of the plane of retroreflective components with an extruded elastomeric material positioned thereon of FIG. 8B after the transfer sheet has been removed, in accordance with aspects hereof.
Figure 8B:
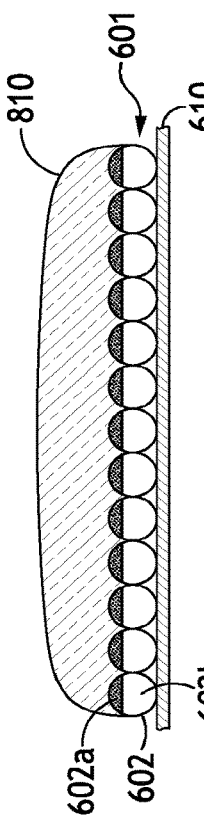
FIG. 8B is a schematic and cross-sectional view of the plane of retroreflective components and the extruded elastomeric material positioned thereon along the cutline 8B illustrated in FIG. 8A, particularly showing the elastomeric material, retroreflective components, and a transfer sheet, in accordance with aspects hereof.

FIG. 8B depicts a schematic cross section along the cut line 8B of the elastomeric material 810 of FIG. 8A. As can be seen in FIG. 8B, the elastomeric material 810 contacts a portion 601 of the plane of retroreflective components 600 such that elastomeric material 810 and the transfer sheet 610 are positioned on opposing sides of the portion 601 of the plane of retroreflective components 600. Further, in such aspects, the elastomeric material 810 is in contact with the reflective material of each of the portion 601 of the plane of retroreflective components 600, e.g., the reflective material 602a on the glass bead 602b of the retroreflective component 602.

As discussed above, in certain aspects, the extruded elastomeric material, e.g., the elastomeric material 810, may be cured in order to harden the elastomeric material 810. In various aspects, once the elastomeric material 810 that has been extruded onto retroreflective components is cured or hardened, the retroreflective components, e.g., the portion 601 of the plane of retroreflective components 600, become fixed within the elastomeric material 810. FIG. 8C depicts a schematic of the cross section depicted in FIG. 8B once the elastomeric material 810 and the portion 601 of the plane of retroreflective components 600 coupled thereto are removed from the transfer sheet 610. In certain aspects, the cured or hardened elastomeric material 810 and the portion 601 of the plane of retroreflective components 600 can be removed from the transfer sheet 610 by lifting the elastomeric material 810 away from the transfer sheet 610.

In order to facilitate or expedite the curing process, the elastomeric material 810 may be exposed to a heat source. For example, the elastomeric material 810 in the shape of the reflective vest 800 as depicted in FIG. 8A can be exposed to a heated surface, such as the heated surface 530 discussed above with reference to FIG. 5. In certain aspects, such as the system 500 depicted in FIG. 5, the elastomeric material can be extruded onto a plane of retroreflective particles that is in contact with a heated surface, e.g., the heated surface 530 of FIG. 5. In such an aspect, by immediately or quickly exposing the extruded elastomeric material to heat, the elastomeric material may cure or harden relatively rapidly.

In alternative aspects, one may desire to embed one or more components into the extruded elastomeric material prior to it hardening. In such an aspect, one may extrude the elastomeric material onto a plane of retroreflective components in the absence of a heated surface, and subsequently expose the extruded elastomeric material to heat after any desired components are embedded in the uncured elastomeric material. Any and all aspects, and any variation thereof, are contemplated as being within aspects herein.

Figure 9A:
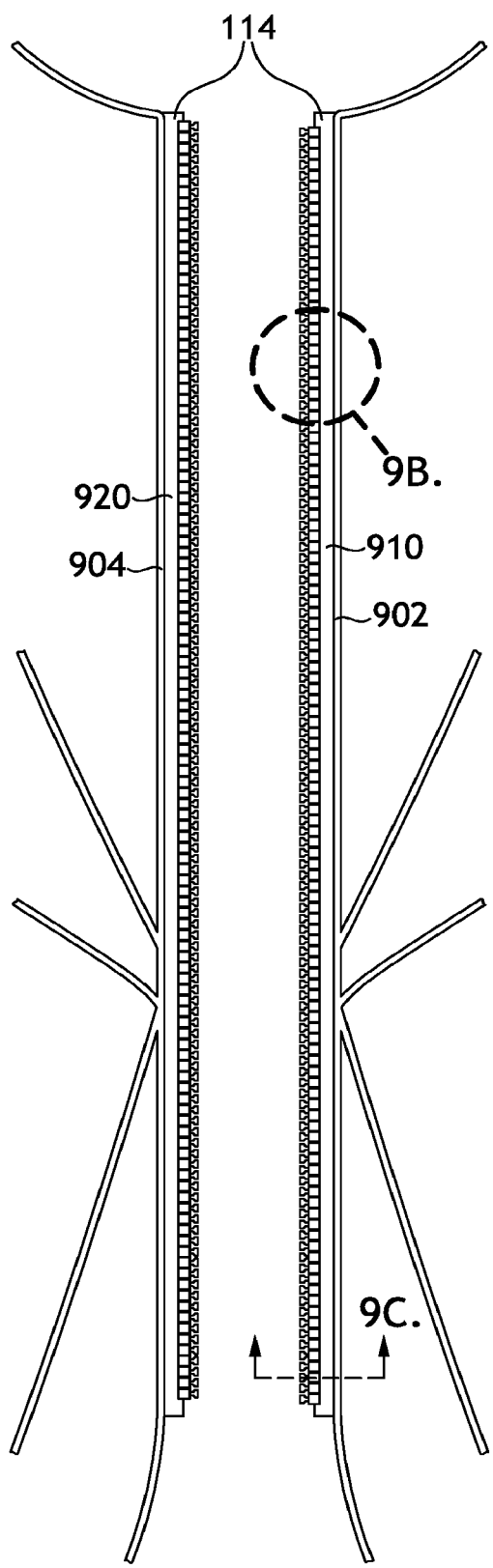
FIG. 9A is a close up view of a portion of the reflective vest of FIG. 3, particularly showing a slider mechanism, in accordance with aspects hereof.

As discussed above, in certain aspects, one or more of the articles of wear disclosed herein can include a slider mechanism such as a zipper. For example, as seen in FIG. 3, the reflective vest 100 includes a slider mechanism in the form of a zipper 114 in the front torso-covering portion 108a. FIG. 9A is a close up view of the zipper 114 of the reflective vest 100 of FIG. 3. As can be seen in FIG. 9A, the zipper 114 includes a first portion 910 coupled to a first strand 902 of the reflective vest 100, and a separate second portion 920 coupled to a second strand 904 of the reflective vest 100. In certain aspects, one or more portions of the zipper 114 can be coupled to the elastomeric material of the strands 902 and 904 while forming the reflective vest 100, e.g., by embedding a portion of the zipper 114 into the elastomeric material of the strands 902 and 904 after being extruded onto a plane of retroreflective components and prior to curing the elastomeric material.

Figure 9B:
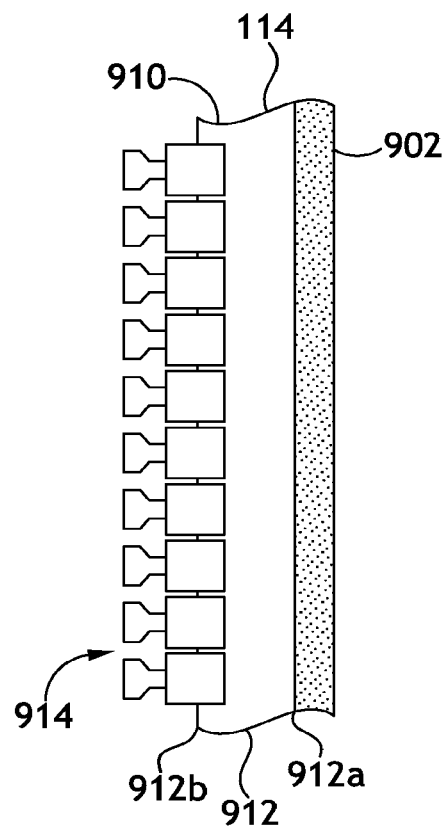
FIG. 9B is a close up view of the slider mechanism and a strand of the reflective vest of FIG. 9A, particularly showing a slider tape coupled to the strand of the reflective vest, in accordance with aspects hereof.

FIG. 9B depicts a close up view of the first portion 910 of the zipper coupled to the first strand 902 of the reflective vest 100. As can be seen in FIG. 9B, the first portion 910 of the zipper can include a zipper tape 912 and a plurality of zipper teeth 914. In the aspect depicted in FIG. 9B, one end 912a of the zipper tape 912 is coupled to the strand 902 of the reflective vest and the plurality of zipper teeth 914 are positioned adjacent the opposing end 912b of the zipper tape 912.

Figure 9C:
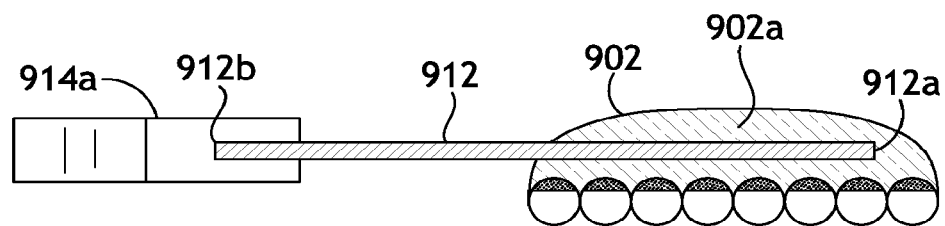
FIG. 9C is a schematic cross section of the slider mechanism and the strand of the reflective vest along the cutline 9C illustrated in FIG. 9A, particularly showing a portion of the slider tape coupled to a strand of the reflective vest, in accordance with aspects hereof.

FIG. 9C is a cross sectional schematic view of the first portion 910 of the zipper coupled to the first strand 902 of the reflective vest. As can be seen in FIG. 9C, the end 912a of the zipper tape 912 is embedded within the elastomeric material 902a of the strand 902, while a zipper tooth 914a is coupled to the opposing end 912b of the zipper tape 912.

Figure 10A:
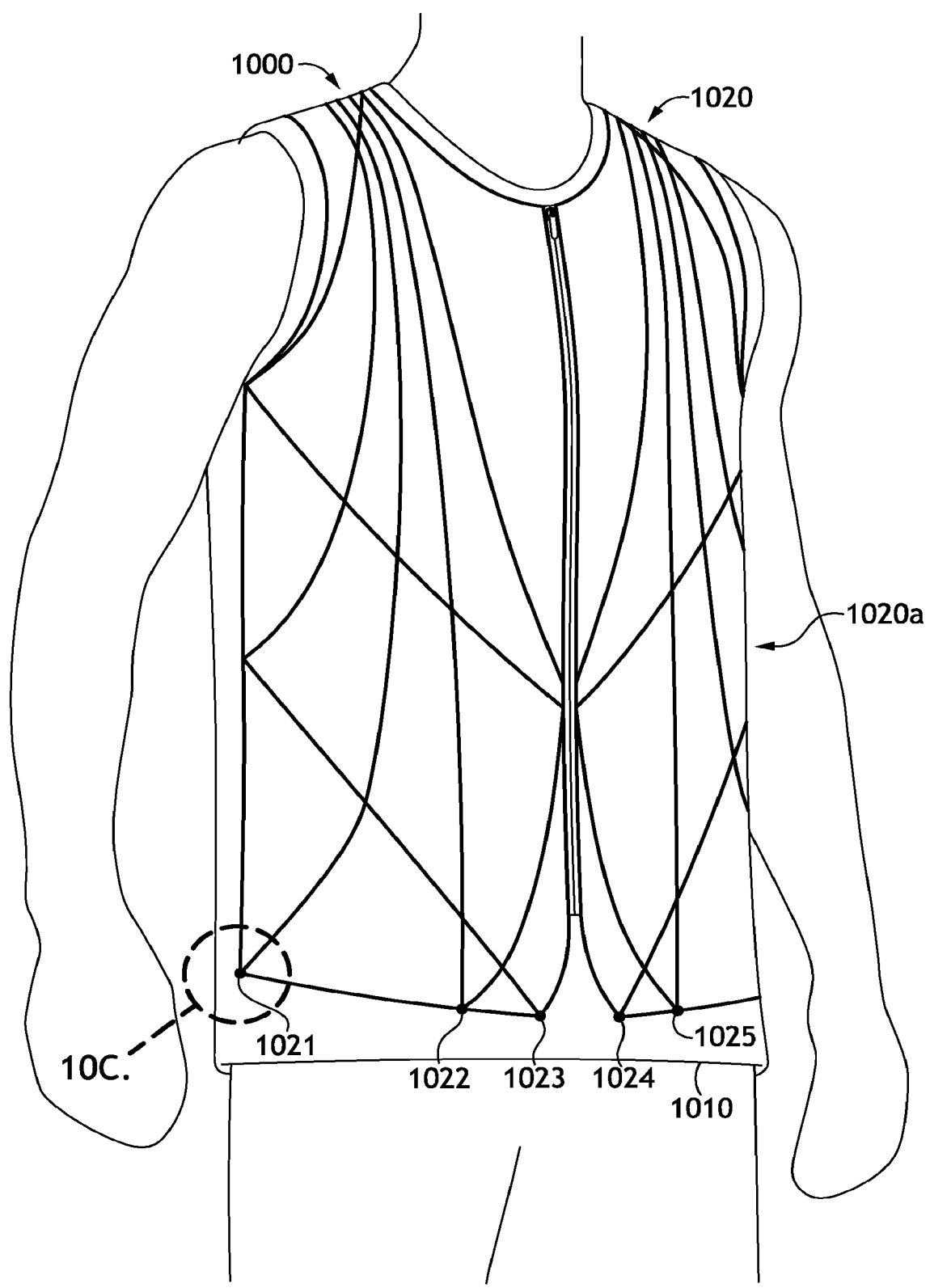
FIG. 10A is a front perspective view of a garment system, particularly showing a reflective vest, an underlying shirt, and reversible fasteners coupled to the reflective vest, in accordance with aspects hereof.
Figure 10B:
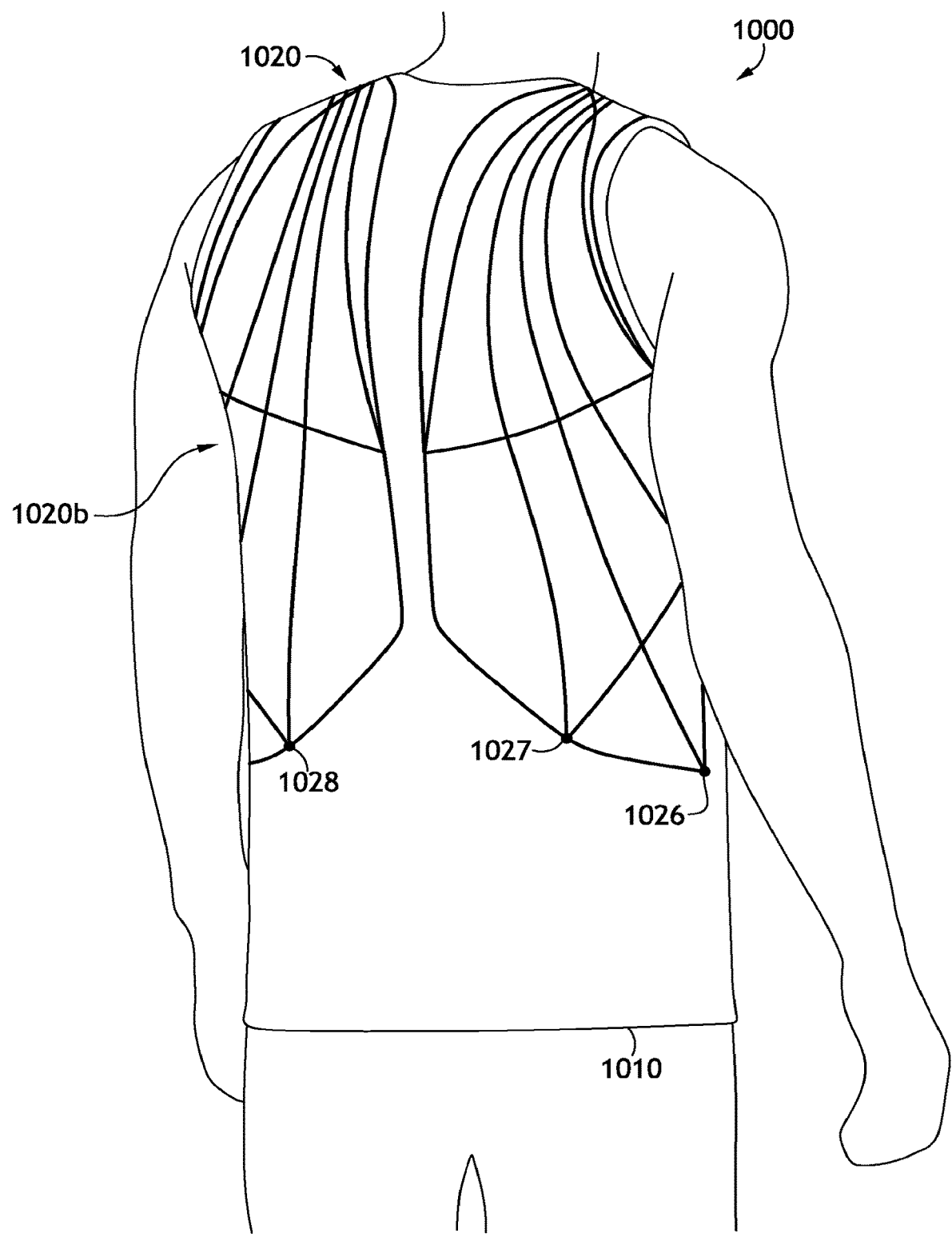
FIG. 10B is another back perspective view of the garment system of FIG. 10A, in accordance with aspects hereof.

As discussed above, in certain aspects, the reflective articles of wear disclosed herein can be one component of a multi-component garment system, where a lightweight reflective article of wear can be temporarily secured to an underlying article. For example, FIGS. 10A and 10B depict a garment system 1000 that includes a reflective vest 1020 positioned over an underlying shirt 1010. It should be understood that the garment system 1000 is one example of a garment system, and that other combinations of articles of wear are also contemplated by the present disclosure. For example, the reflective vest 1020 can be coupled to another vest or jacket, instead of the underlying shirt 1010. The reflective vest 1020 can have any or all of the properties of the reflective vests or reflective articles of wear discussed above. For example, in certain aspects, the reflective vest 1020 can include one or more retroreflective components coupled to an elastomeric material.

Figure 10C:
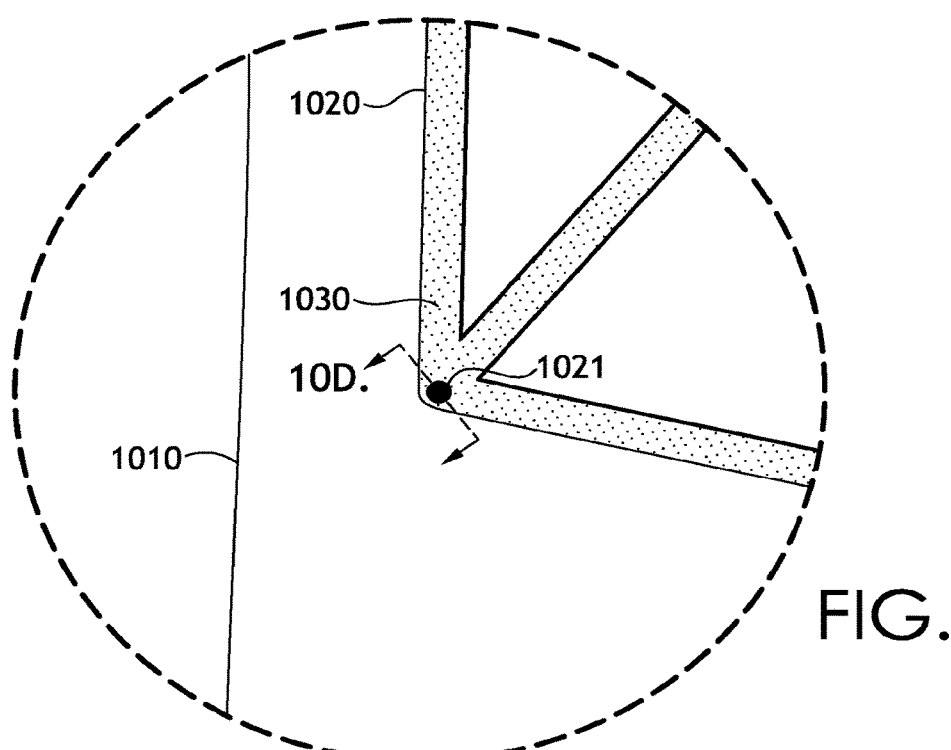
FIG. 10C is a close up view of a reversible fastener coupled to the reflective vest of FIG. 10A, in accordance with aspects hereof.

In aspects, the reflective vest 1020 can include reversible fasteners to temporarily secure the reflective vest 1020 to the underlying shirt 1010. For example, as can be seen in FIG. 10A, the front torso-covering portion 1020a of the reflective vest 1020 includes reversible fasteners 1021, 1022, 1023, 1024, and 1025 embedded within the reflective vest 1020, e.g., embedded within the elastomeric material of the reflective vest 1020. FIG. 10C depicts a close up view of the reversible fastener 1021 embedded in the reflective vest 1020. As can be seen in FIG. 10C, the reversible fastener 1021 is embedded within a portion of elastomeric material 1030 of the reflective vest 1020.

Further, as can be seen in FIG. 10B, the back torso-covering portion 1020b of the reflective vest 1020 includes reversible fasteners 1026, 1027, and 1028 embedded within the reflective vest 1020. It should be understood that the number and position of the reversible fasteners 1021-1028 is just one example aspect depicted herein and that a particular number and position of reversible fasteners can be chosen by one skilled in the art for a specific purpose.

The reversible fasteners 1021-1028 can be any type of fasteners utilized for articles of apparel. In one aspect, the reversible fasteners 1021-1028 can include a magnet. In alternative aspects, the reversible fasteners 1021-1028 can be one portion of a hook and loop fastener, one portion of a snap fastener, and the like. In certain aspects, the reversible fasteners 1021-1028 can be coupled to or embedded within the reflective vest 1020 (or the elastomeric material 1030 within the reflective vest 1020) using any known techniques. In one aspect, a magnet or portion of a hook and loop fastener could be placed within the elastomeric material 1030 of the reflective vest 1020 prior to curing the elastomeric material 1030 so that upon curing, the reversible fastener is at least partly embedded within the elastomeric material 1030 of the reflective vest 1020. Such embedding techniques are described herein with reference to a zipper and/or LED lights and other light sources.

Figure 10D:
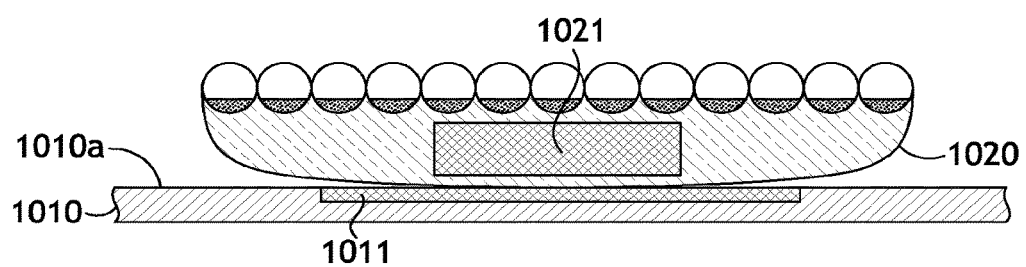
FIG. 10D is a schematic and cross sectional view of the reflective vest and underlying shirt of FIG. 10C along the cutline 10D, particular showing a reversible fastener coupled to the reflective vest and a reversible fastener coupled to the underlying shirt, in accordance with aspects hereof.

In aspects, the reversible fasteners 1021-1028 associated with the reflective vest 1020 can cause the reflective vest 1020 to temporarily connect or removably couple to the underlying shirt 1010. In such aspects, the underlying shirt 1010 includes one or more reversible fasteners that are complementary to the reversible fasteners 1021-1028 associated with the reflective vest 1020. For example, as can be seen in FIG. 10D, which depicts a schematic cross section of the reflective vest 1020 and underlying shirt 1010 of FIG. 10C, the underlying shirt 1010 includes a reversible fastener 1011 coupled thereto.

The reversible fastener 1011 associated with the underlying shirt 1010 can be any type of reversible fastener, such as a magnet, metal material, or one portion of a hook and loop fastener. In aspects, the reversible fastener 1011 can be secured to the underlying shirt 1010 using conventional techniques, such as stitching or the use of an adhesive. In one aspect, the reversible fastener can be screen printed onto the underlying shirt 1010. For example, the underlying shirt 1010 can have a ferrous material or other metal material screen-printed onto an outer surface 1010a of the underlying shirt 1010 that faces away from the wearer when worn. In aspects, the screen-printing of the ferrous or other metal material onto the underlying shirt 1010 can be performed using available materials and equipment (commercial or otherwise).

While not shown in the figures, the underlying shirt 1010 can also include reversible fasteners that are complementary in function and position to the other reversible fasteners 1022-1028 of the reflective vest 1020 described above. In aspects, the complementary reversible fasteners associated with the underlying shirt 1010 and the reversible fasteners 1021-1028 of the reflective vest 1020 allow for registration between the reflective vest 1020 and the underlying shirt 1010, thus ensuring that the reflective vest 1020 lays properly and facilitating the donning process. In aspects, the reversible fasteners 1021-1028 associated with the reflective vest 1020 and the reversible fasteners associated with the underlying shirt 1010, e.g., the reversible fastener 1011, allow a wearer to increase their visibility in a dark setting in a lightweight and minimalist manner.

Figure 17:
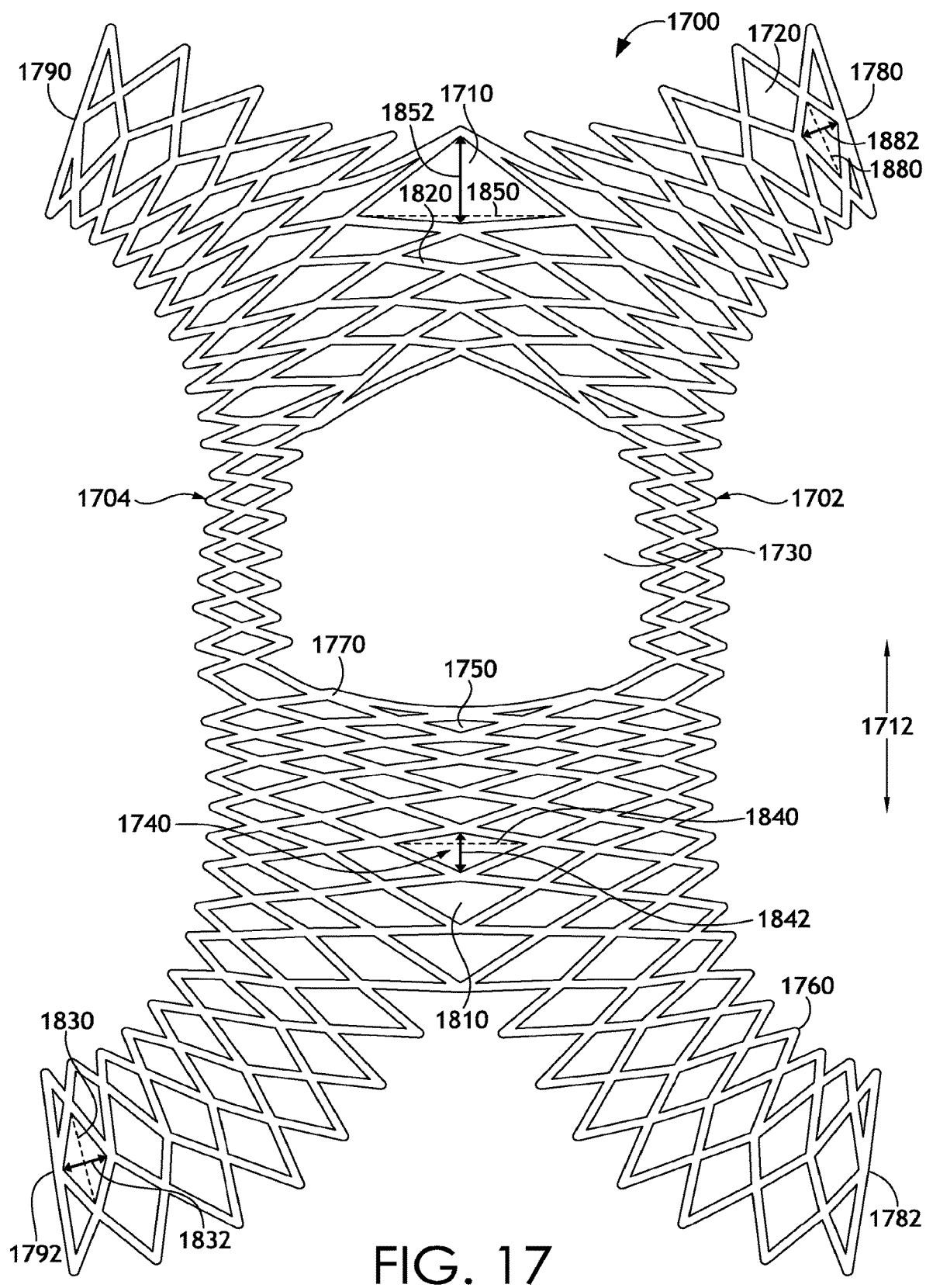
FIG. 17 is a plan view of another example reflective article of wear, in accordance with aspects hereof.
Figure 18:
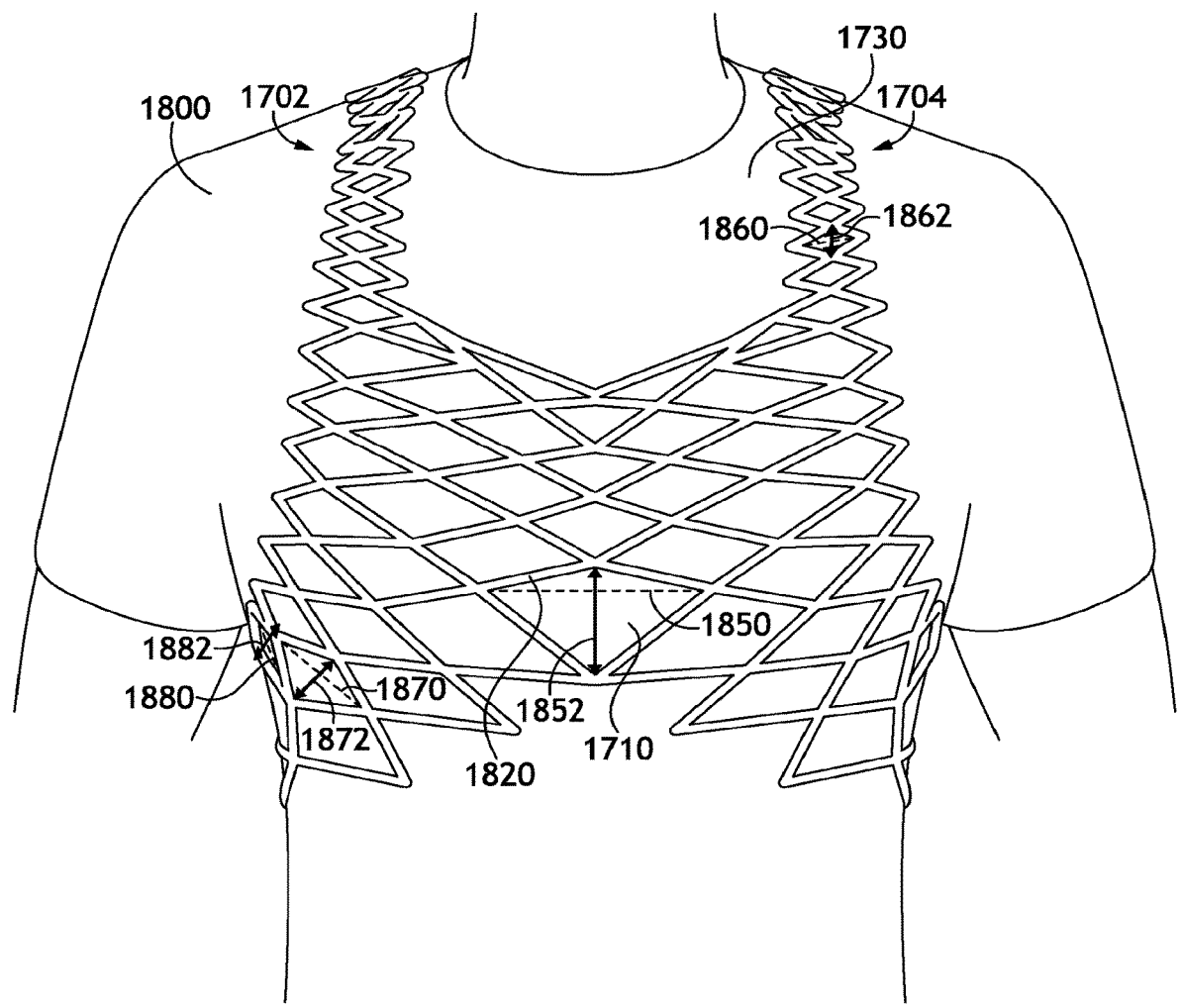
FIG. 18 is a perspective view of the reflective article of wear in FIG. 17 positioned over an underlying shirt when in an as-worn configuration, particularly showing the front torso-covering portion of the reflective article of wear, in accordance with aspects hereof.

FIG. 17 depicts a reflective upper torso cover 1700 configured to cover the upper torso of a wearer when the upper torso cover 1700 is appropriately sized for the wearer and when the upper torso cover 1700 is worn as intended by the wearer standing in an upright position. In aspects, the reflective upper torso cover 1700 allows a wearer to provide reflectivity to a portion of their upper torso without donning a full vest. The reflective upper torso cover 1700, similar to the reflective vest 100 shown in FIG. 3, is comprised of a plurality of overlapping elastomeric strands such as overlapping elastomeric strands 1760 and 1770 forming a webbed structure having a plurality of apertures such as apertures 1710, 1720, 1740, and 1750. The webbed structure may be manufactured in a flat configuration as shown, where the plurality of overlapping strands such as the overlapping elastomeric strands 1760 and 1770 form a collar opening 1730 defined, in part, by the shoulder portions or shoulder straps 1702 and 1704. When worn by a wearer, as shown in FIG. 18, a front portion or front panel 1820 is configured to cover a chest portion of the wearer and a back portion or back panel 1810 is configured to cover a back portion of the wearer. The reflective upper torso cover 1700 may be formed into shape by joining the edge 1780 with the edge 1782, and joining the edge 1790 with the edge 1792. In aspects, the edges 1780 and 1790 may be permanently joined to edges 1782 and 1792, respectively, by stitching, adhesive bonding, thermal bonding, or the like. Alternatively, the edges 1780 and 1790 may be reversibly joined to edges 1782 and 1792, respectively, by reversible fasteners such as, for example, magnets, hook and loop fasteners, buttons, locking strips, or the like. When the edges 1780 and 1790 are permanently or temporarily joined to edges 1782 and 1792, respectively, the webbed structure can be formed into the reflective upper torso cover 1700 further defining a pair of armholes 1706 and 1708, through which the wearer may extend his/her arms when wearing the reflective upper torso cover 1700.

The overlapping elastomeric strands, e.g., the strands 1760 and 1770 may be configured to form a stretchy pattern that may be configured to conform to a wearer's body when the reflective upper torso cover 1700 is donned. The stretchy pattern is comprised of a plurality of shaped apertures that generally comprise a long axis and a short axis that is perpendicular to the long axis. The long axis is generally orthogonal to a tensioning force, which allows the reflective upper torso cover 1700 to mechanically stretch in the direction of the tensioning force. It is desirable that different portions of the reflective upper torso cover 1700 be expandable in different directions in order to provide a comfortable and secure fit. Therefore, as shown in FIG. 17, the shapes of the apertures at different portions of the reflective upper torso cover 1700 gradually shift in the direction of their long axis in order to provide the variable mechanical expansion. For example, the shapes of the apertures near a central area of the front portion or front panel 1820 and of the back portion or back panel 1810 comprise a long axis 1850 and 1840, respectively, that is generally orthogonal to a hypothetical vertical axis 1712, which is parallel to a wearer's height axis when the reflective upper torso cover 1700 is worn as intended by the wearer and when the wearer is standing in an upright position, as shown in FIG. 18. As such, the apertures near the central area of the front portion or front panel 1820 may expand and contract to a higher degree in the direction of the arrow 1852, which for example, is along the short axis of the aperture 1710, while the apertures near the central area of the back portion or back panel 1810 may expand and contract to a higher degree in the direction of the arrow 1842, which for example, is along the short axis of the aperture 1740. In other words, each of the apertures (e.g., 1710, 1720, 1740, and 1750) may be deformed to a first degree in a direction that is parallel to their respective long axes and may be deformed to a second degree in a direction that is orthogonal to their respective long axes (i.e., along their short axes, which in aperture 1740 on the back panel 1810, is parallel to the hypothetical vertical axis 1712). The direction of arrows 1852 and 1842 are parallel to a tensioning force that the wearer would apply to the reflective upper torso cover 1700 when donning the reflective upper torso cover 1700. Further, the shapes of the apertures near the edges 1780, 1782, 1790, and 1792 of the reflective upper torso cover 1700 have the direction of their long axis (e.g., long axis 1880 near edge 1780 and long axis 1830 near edge 1792) shifted so that their long axis (e.g., 1880 and 1830) is nearly (i.e. at or almost) parallel to the hypothetical vertical axis 1712. Therefore, the apertures located near the edges 1780, 1782, 1790, and 1792 may expand and contract in a direction that is orthogonal to their respective long axes (e.g. along the arrow 1882 for the aperture comprising long axis 1880 and along the arrow 1832 for the aperture comprising long axis 1830.) The apertures that are in between, may comprise long axes that gradually shift from being orthogonal to the hypothetical vertical axis 1712 to being parallel or nearly parallel to the hypothetical vertical axis 1712 (for example, FIG. 18 shows an intermediate shape having a long axis 1870 that is at an angle from the hypothetical vertical axis 1712, and having a direction of compression and expansion along the arrow 1872.) Further, as shown in FIG. 18, the apertures located near the shoulders of a wearer when the reflective upper torso cover 1700 is worn, may also comprise a long axis (e.g., 1860) that is nearly orthogonal to the hypothetical vertical axis 1712 to allow the wearer to comfortably pull down on the reflective upper torso cover 1700 when donning (i.e. reduce resistance from garment.) Therefore, the reflective upper torso cover 1700 may adapt to the shape of the wearer and provide a secure fit when donned, regardless of the shape of the wearer depending on the size of the wearer and/or the bulkiness provided by the type of garment that the wearer may be wearing underneath the reflective upper torso cover 1700, such as shirt 1800. In other words, the configuration of the apertures (e.g., 1710, 1720, 1740, and 1750) and their respective shape, allow the reflective upper torso cover 1700 to adapt to the shape of a wearer's body, apart from the inherent elasticity of the elastomeric strands. Said differently yet, even if the elastomeric strands forming the webbed structure of the reflective upper torso cover 1700 were not elastic, or were minimally elastic, the shape of the apertures (e.g., 1710, 1720, 1740, and 1750) and their configuration with respect to the webbed structure, allow the reflective upper torso cover 1700 to be flexible for easy donning and doffing of the garment. Further, because of the flexibility of the reflective upper torso cover 1700, the reflective upper torso cover 1700 may not necessarily need a special complementary garment for providing a secure fit.

Figure 19:
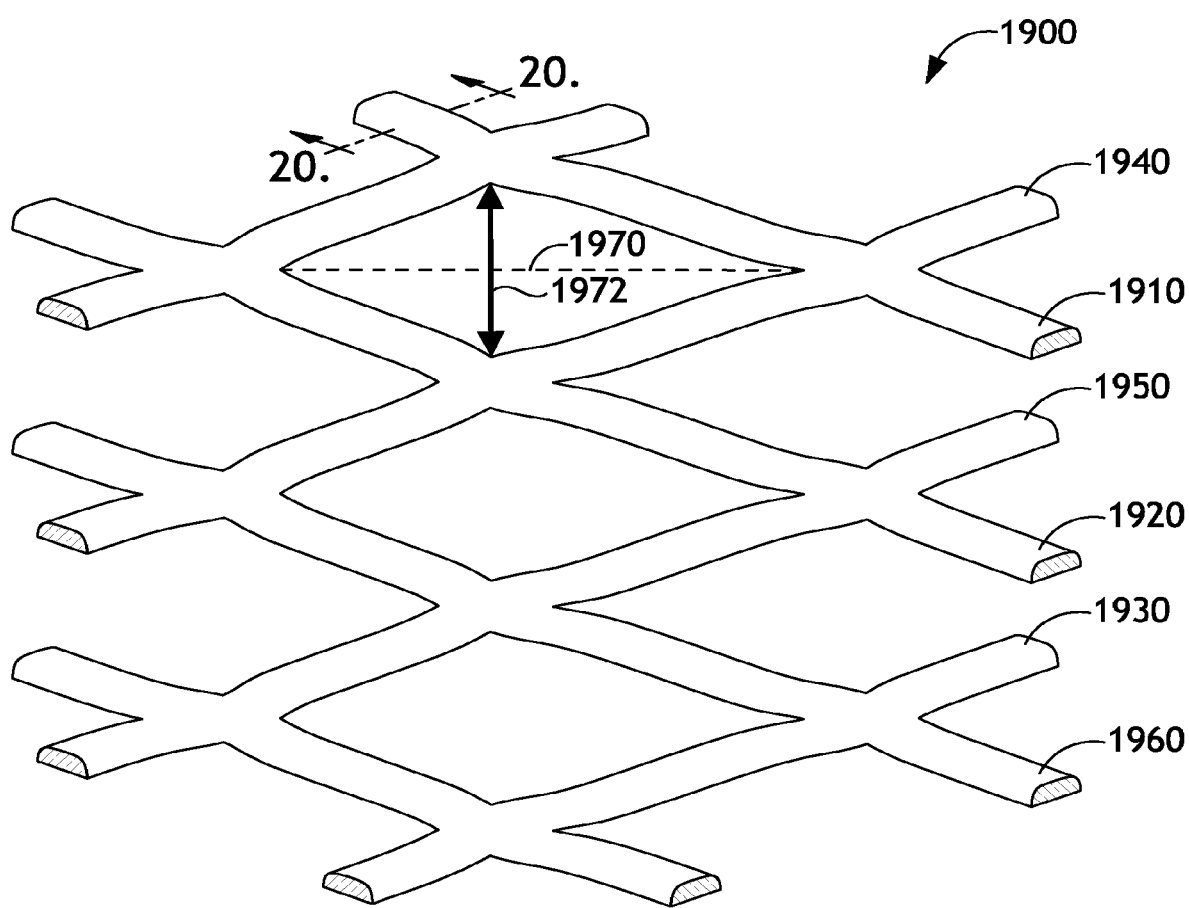
FIG. 19 is a close-up view of the article of wear in FIGS. 17 and 18, in accordance with aspects hereof.

FIG. 19 shows a close-up view 1900 of elastomeric strands (e.g., the elastomeric strands 1910, 1920, 1930, 1940, 1950, and 1960) that may form, for example, at least a portion of the reflective upper torso cover 1700. The elastomeric strands 1910, 1920, and 1960, overlap with the elastomeric strands 1930, 1940, and 1950 to form an integral webbed structure of reflective elastomeric strands. In one aspect, the configuration of overlapping elastomeric strands 1910, 1920, 1930, 1940, 1950, and 1960 depicted in FIG. 19 (and of the reflective upper torso cover 1700 of FIG. 18) can facilitate the expansion and contraction of the article in the direction of the arrow 1972 that is orthogonal to the long axis 1970 of the respective shapes of the apertures in the pattern of shaped apertures forming the webbed structure of the reflective upper torso cover 1700 depicted in FIGS. 17 and 18, which can provide an enhanced ability for the article of wear such as reflective upper torso cover 1700 to expand and contract for, as described above, easy donning and doffing of the reflective article of wear, and to provide a secure fit by adapting to the shape of the wearer's body parts that the reflective article of wear is donned on.

It is contemplated that any aperture shape that has the ability to provide structural expansion and contraction, such as hexagon, a quadrilateral (e.g., diamond), auxetic hexagon, and the like, may be used for shaping the apertures of the webbed structure when forming the reflective articles of wear in accordance with aspects herein. Further, although only shown in the reflective upper torso cover 1700, it is also contemplated that the structural pattern of apertures forming the reflective upper torso cover 1700 may also be used for forming covers configured to adapt to other body parts of the wearer such as, wrists, ankles, legs, arms, and the like. As well, the technology described herein, may also be used to form reflective covers for portions of or whole articles such as bikes, helmets, scooters, and the like, to increase their visibility when needed.

Figure 20:
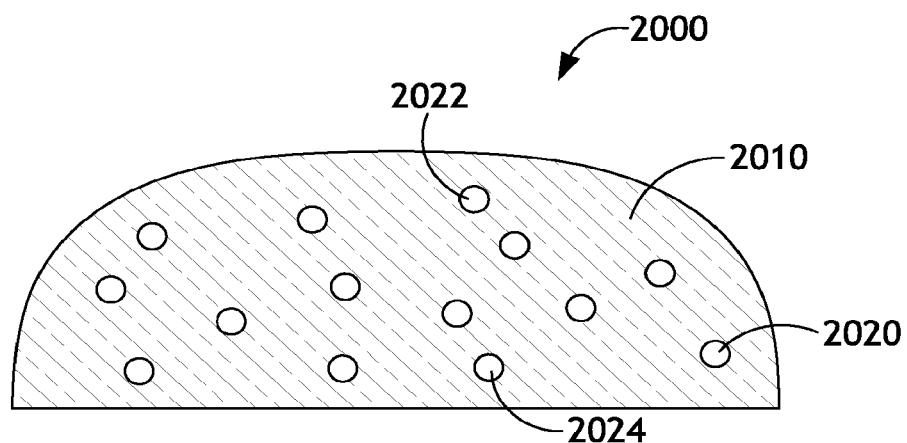
FIG. 20 is a schematic and cross-sectional view along cutline 20 in FIG. 19 showing a thermoplastic strand of the article of wear in FIG. 19, in accordance with aspects hereof.

As described above, reflective and/or retroreflective components may be coupled to or embedded within the surface of the elastomeric strands 1910, 1920, 1930, 1940, 1950, and 1960, or, the reflective and/or retroreflective components may be mixed and suspended into the uncured elastomeric material prior to extrusion and curing. FIG. 20 depicts a cross-section 2000 of the elastomeric strand 1910 in FIG. 19, along the cutline 20 in one aspect when the elastomeric strands 1910, 1920, 1930, 1940, 1950, and 1960 are formed by suspending reflective and/or retroreflective components into the uncured elastomeric material. It should be understood that the cross-section 2000 of FIG. 20 is schematic and just one aspect of a cross-section of the elastomeric strand 1910, e.g., the elastomeric strand 1910 may not include reflective components suspended within the elastomeric material but instead may be comprised of an elastomeric material with retroreflective components embedded therein, such as that described above with reference to FIGS. 1-4.

As shown in the aspect depicted in FIG. 20, when suspended into the elastomeric material 2010 prior to curing, the reflective and/or retroreflective components 2020 may remain suspended and fixed into place as the elastomeric material 2010 becomes cured and hardened. The elastomeric material 2010 used for suspension of the reflective and/or retroreflective components may be substantially transparent in order to allow the reflective and/or retroreflective component properties to work even when not on the surface of the elastomeric strands. Because of the random distribution of the reflective and/or retroreflective components 2020 present in the elastomeric material 2010, the reflective properties of the reflective and/or retroreflective components 2020 may be changed. For example, a reflective and/or retroreflective component 2022 closer to the outer facing surface of the elastomeric strand's surface may provide more reflection than a reflective and/or retroreflective component 2024 that is closer to the inner facing surface of the elastomeric strand, e.g., due to the incoming or reflected light being refracted by the elastomeric material. It should be understood that the cross-section 2000 is schematic and may not depict the actual amount or position of reflective particles within the elastomeric material.

Figure 24:
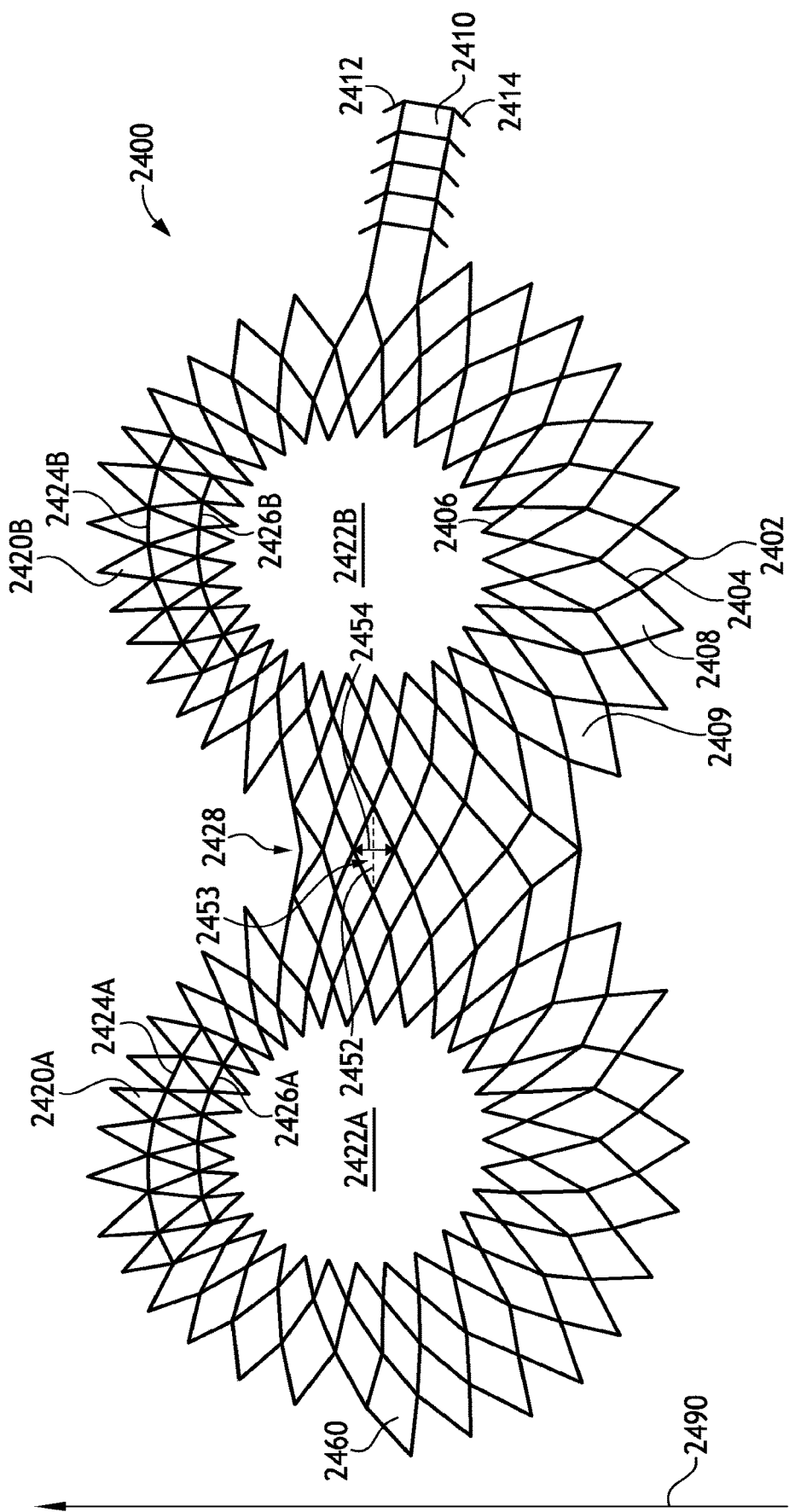
FIG. 24 is a plan view of another example reflective article of wear, in accordance with aspects hereof.

FIG. 24 depicts a reflective upper torso cover 2400 configured to cover the reflective upper torso of a wearer when the upper torso cover 2400 is appropriately sized for the wearer and when the reflective upper torso cover 2400 is worn as intended by the wearer standing in an upright position. In aspects, the reflective upper torso cover 2400 allows a wearer to provide reflectivity to a portion of their upper torso without donning a full vest. The reflective upper torso cover 2400, similar to the reflective vest 1700 shown in FIG. 17, is comprised of a plurality of overlapping elastomeric strands, such as overlapping elastomeric strands 2402, 2404, and 2406, that form a plurality of apertures, such as apertures 2408 and 2409. The plurality of overlapping strands, can form a back portion 2428, as well as define an armhole opening 2422A (e.g., right side armhole) and an armhole opening 2422B (e.g., left side armhole). In aspects, the elastomeric strands of the reflective upper torso cover 2400 can include any or all of the properties of the elastomeric strands discussed above with reference to the other aspects described herein. For example, the elastomeric strands of the reflective upper torso cover 2400 can included reflective or retroreflective particles embedded in the elastomeric material (e.g., on an outer surface of the elastomeric material) and/or can be suspended within the elastomeric material.

Figure 25:
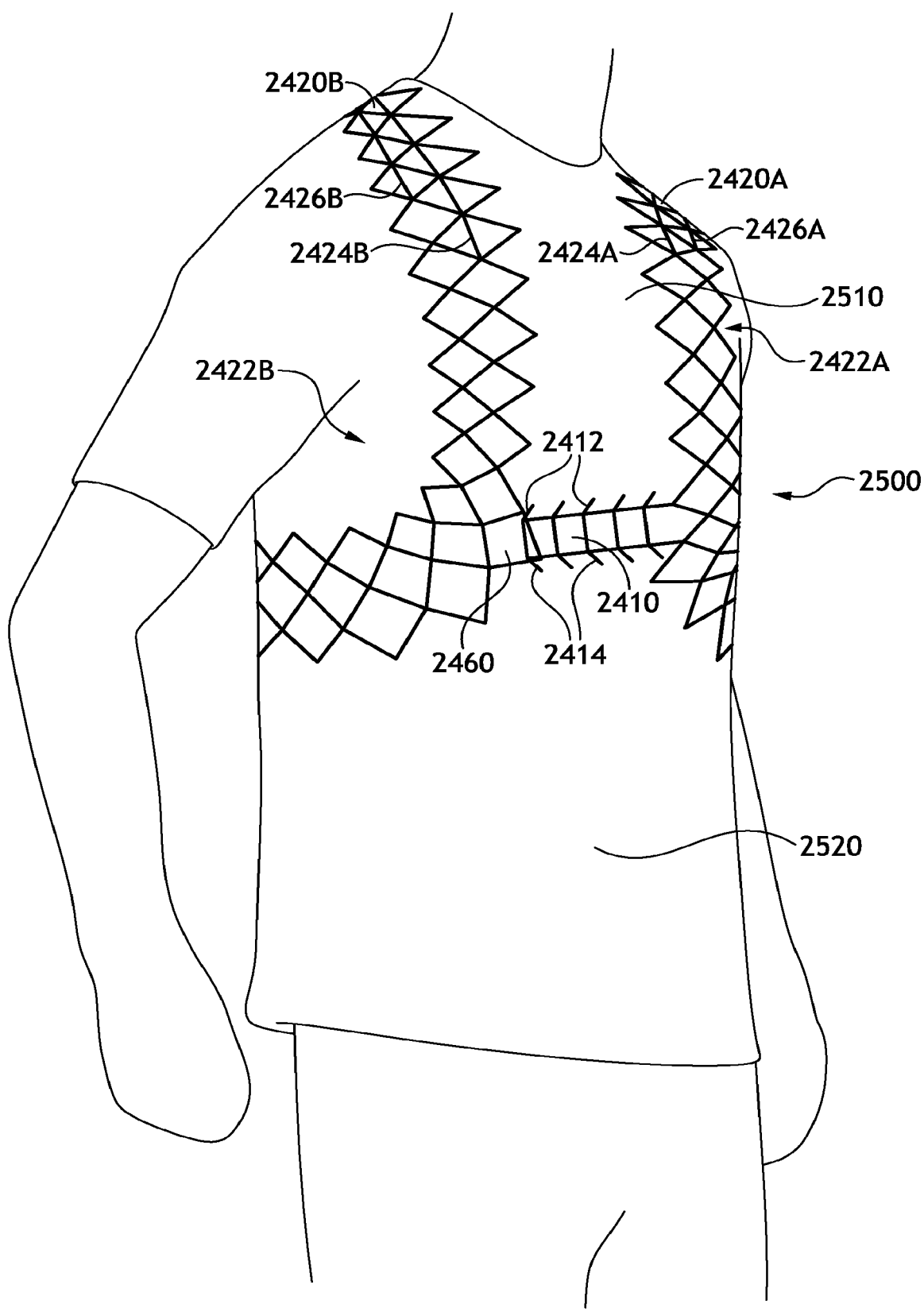
FIG. 25 is a perspective view of the reflective article of wear in FIG. 24 positioned over an underlying shirt when in an as-worn configuration, particularly showing the front torso-covering portion of the reflective article of wear, in accordance with aspects hereof.

When worn by a wearer, as shown in FIG. 25, a securing member 2410 may be used for securing the reflective upper torso cover 2400 around the upper torso of the wearer when the reflective upper torso cover 2400 is donned. In the aspect depicted in FIG. 25, the securing member 2410 can be adjacent one the armhole openings, e.g., the armhole opening 2422B, and can extend across the front torso region of a wearer, and can couple to an aperture adjacent the other armhole opening, e.g., the armhole opening 2422A. In aspects, the securing member 2410 may include a plurality of hook portions 2412 and 2414 configured to hook into an aperture, such as, aperture 2460. Although not explicitly shown, it is contemplated that the securing member 2410 may also comprise other shapes than the one shown such as, a single strand with a plurality of hooks, a curvilinear strand with a plurality of hooks, a wider straight or curvilinear strand with a plurality of hooks (wider strands may be characterized as being wider than strands 2402, 2404, and 2406, for example, that form the body portion of the reflective upper torso cover 2400), a tape like structure with a plurality of hooks, and the like. It is further contemplated that other securing mechanisms can be utilized to secure the reflective upper torso cover 2400 to the upper torso of the wearer, such as the complementary reversible fasteners 2160 discussed above with reference to FIG. 21, or other types of fasteners discussed above.

Figure 26:
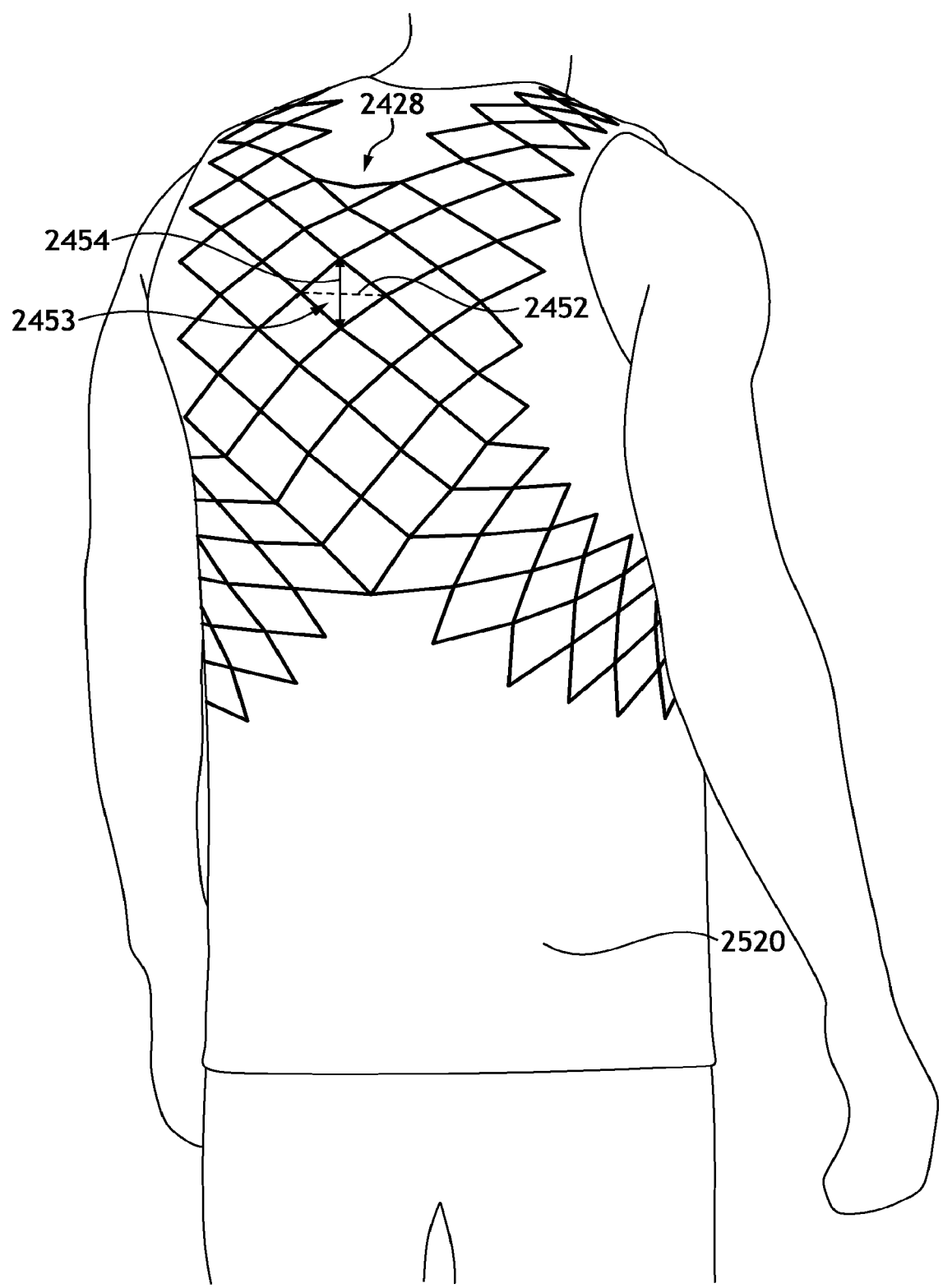
FIG. 26 is a perspective view of the reflective article of wear in FIG. 24 positioned over an underlying shirt when in an as-worn configuration, particularly showing the back torso-covering portion of the reflective article of wear, in accordance with aspects hereof.

In the aspect depicted in FIGS. 24-26, the reflective upper torso cover 2400 provides an increased number of elastomeric strands to a back portion 2428 of the wearer (as can be seen in FIG. 26) when compared to the number of elastomeric strands provided to a front portion of the wearer. This configuration may be advantageous in making the reflective upper torso cover 2400 much lighter, and, the front portion 2500 of the reflective upper torso covering 2400 may provide exposure to a greater section of the wearer's chest 2510 for, for example, securely attaching a runner's bib, or the like.

The overlapping elastomeric strands, e.g., the strands 2402, 2404, and 2406 may be configured to form a pattern that expands and contracts in order to better conform to a wearer's body, and to aid in the donning and doffing of the reflective upper torso cover 2400. In aspects, the overlapping elastomeric strands may form a repeating pattern that is at least partly similar to the pattern depicted in the reflective upper torso cover 1700 of FIG. 17. In such an aspect, the elastomeric strands of the reflective upper torso cover 2400 may form a pattern of shapes or apertures that generally comprise a long axis and a short axis that is perpendicular to the long axis. In certain aspects, the long axis can be generally orthogonal to a tensioning force, which allows the reflective upper torso cover 2400 to mechanically stretch in the direction of the tensioning force.

In various aspects, when in an as-worn configuration, the shapes of the apertures formed by the overlapping elastomeric strands may expand or contract along one or more axes in order to provide a more comfortable and secure fit, and to aid in the donning and doffing process. As shown in the aspect depicted in FIG. 24, the shapes of the apertures at different portions of the reflective upper torso cover 2400 have their long axes and short axes shift direction in order to provide the variable mechanical expansion throughout the reflective upper torso cover 2400. The directional shift can be better observed in the apertures surrounding the armholes 2422A and 2422B. For example, since the apertures surrounding the armholes 2422A and 2422B are generally arranged around a circular structure, the long axes and short axes of the apertures forming the generally circular structure are gradually shifted around the circumference of the generally circular structure. Such construction, for example, allows the reflective upper torso cover 2400 to adapt to the shape of the wearer and provide a secure fit when donned, regardless of the shape or size of the wearer and/or regardless of the bulkiness provided by the type of garment that the wearer may be wearing underneath the reflective upper torso cover 2400, such as shirt 2520. For example, the aperture 2453 may comprise a long axis 2452 that is orthogonal to a hypothetical vertical axis 2490, which is parallel to a wearer's height axis when the reflective upper torso cover 2400 is worn as intended by the wearer and when the wearer is standing in an upright position, as shown in FIG. 25. The aperture 2453 may expand and/or contract along the long axis 2452 and/or the short axis 2454, where the long axis 2452 is orthogonal to the short axis 2454, as can be seen by comparing the upper torso covering 2400 in isolation in FIG. 24 and donned in FIG. 26. It should be noted however, that differently shaped apertures may have different number of axes, which may behave differently in response to a tensioning force, such as for example, an auxetic hexagon, and the like.

In aspects, it may be desirable to include additional elastomeric strands in the shoulder portions or shoulder straps 2420A and 2420B for reinforcement. For example, as can be seen in FIG. 24, the shoulder portions or shoulder straps 2420A and 2420B can include reinforcement strands 2424A, 2426A, 2424B, and 2426B, respectively that extend from a front torso portion towards a back torso portion. In various aspects, the expansion of the apertures in the shoulder portions or shoulder straps 2420A and 2420B may be limited by the reinforcement strands 2424A, 2426A, 2424B and 2426B, since in the aspects depicted in FIG. 24, apertures in the shoulder portions or shoulder straps 2420A and 2420B, are at least partly defined by the reinforcement strands 2424A, 2426A, 2424B and 2426B, and are smaller than apertures in other regions, such as the underarm regions.

Figure 11:
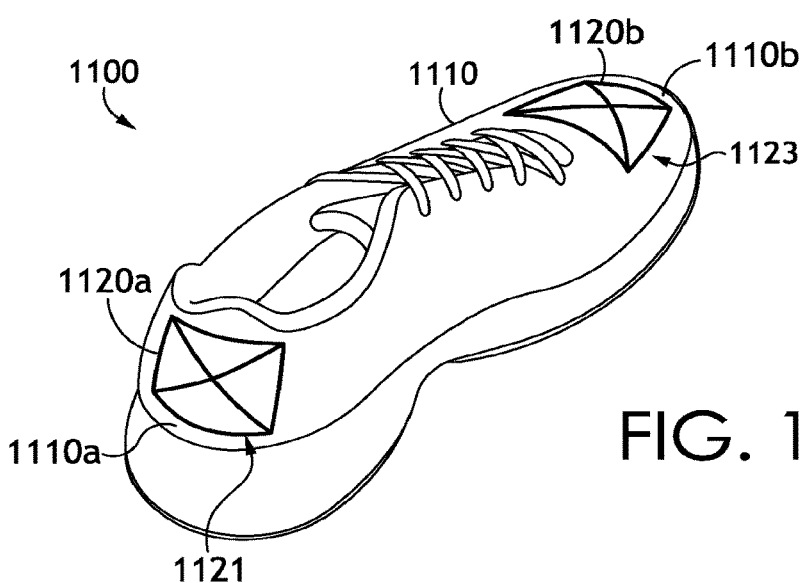
FIG. 11 is a perspective view of another garment system, particularly showing a reflective component coupled to an article of footwear, in accordance with aspects hereof.

As described above with reference to the reflective upper torso cover 1700, it is contemplated that any shape that has the ability to provide structural expansion and contraction, such as hexagon, diamond, auxetic hexagon, and the like, may be used for the apertures when forming the reflective articles of wear in accordance with aspects herein, such as the reflective upper torso cover 2400. As discussed above, other types of multi-component systems that include an outer reflective component applied to an underlying article of wear are also contemplated by the disclosure herein. For example, FIG. 11 depicts a multi-component system 1100 that includes reflective components 1120a and 1120b coupled to an article of footwear 1110. The reflective components 1120a and 1120b can have any or all of the general properties of the above-described reflective articles. For example, in aspects, the reflective components 1120a and 1120b can be comprised of an elastomeric material with retroreflective components embedded therein, such as that described above with reference to FIGS. 1-4. Further, the reflective components 1120a and 1120b can include a plurality of apertures 1121 and 1123, respectively, through which, for instance, the underlying upper material may be visible.

As can be seen in FIG. 11, the lightweight reflective component 1120a is coupled to a heel end 1110a of the article of footwear 1110, and the lightweight reflective component 1120b is coupled to a toe end 1110b of the article of footwear 1110. It should be understood that the position of the reflective components 1120a and 1120b on the article of footwear 1110 is just one example for positioning reflective components on an article of footwear, and that other positions for reflective components can be chosen by one skilled in the art for a particular purpose. Similarly, the pattern and shape of the reflective components 1120a and 1120b is just one example pattern and shape and other patterns and shapes are contemplated by the disclosure herein.

In aspects, the reflective components 1120a and 1120b can be coupled to the article of footwear 1110 using any reversible or temporary securing mechanisms, such as the reversible fasteners discussed above with reference to FIGS. 10A-10D. It is also contemplated herein, that the reflective components 1120a and 1120b may be permanently secured to the article of footwear 1110.

Figure 12:
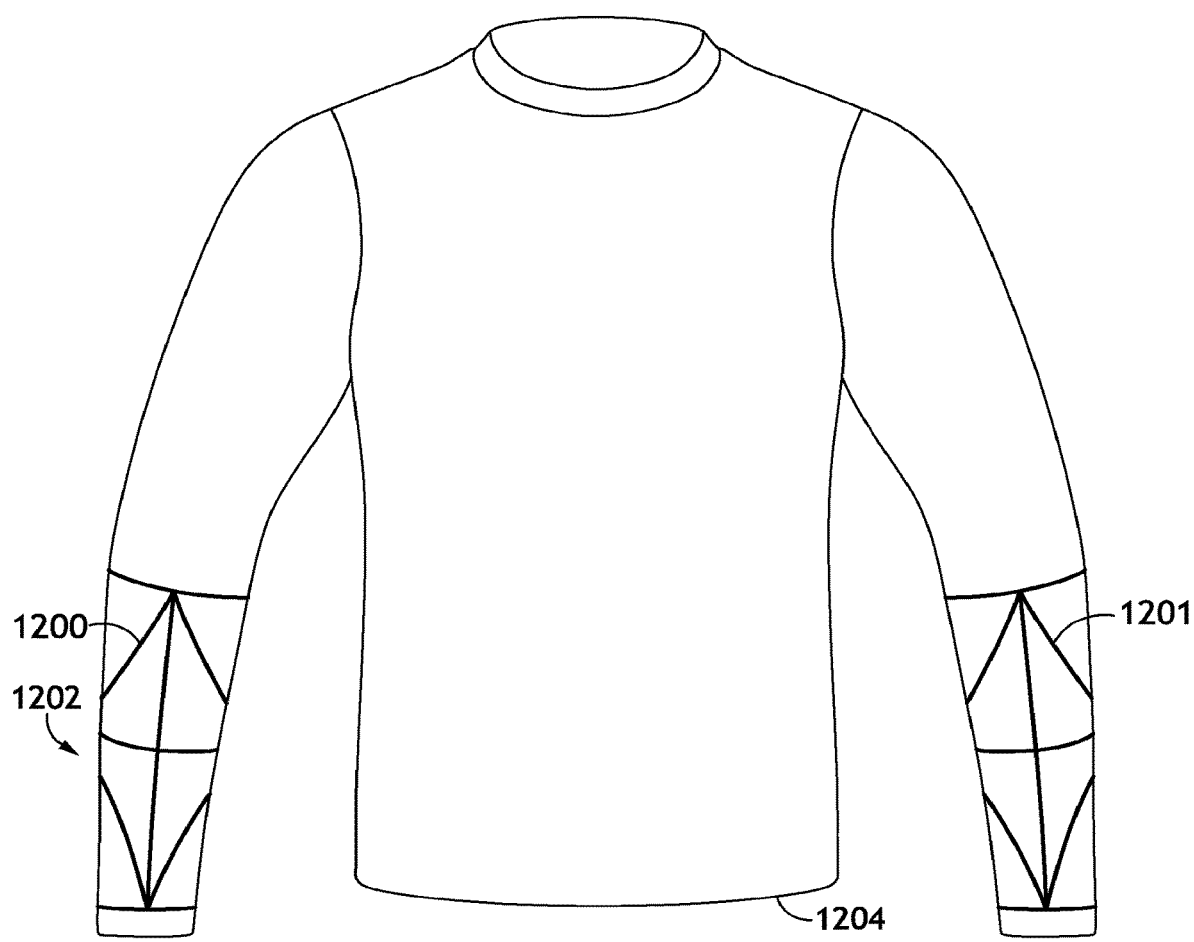
FIG. 12 is a front view of a lightweight reflective arm sleeve positioned on one arm of an underlying shirt and another lightweight reflective arm sleeve positioned on another arm of the underlying shirt, in accordance with aspects hereof.

As discussed above, the reflective articles of wear disclosed herein can include any type of article of wear. FIG. 12 depicts reflective arm sleeves 1200 and 1201, as another example of a reflective article of wear. While the following description focuses on the arm sleeve 1200, it should be understood that this description also applies to the reflective arm sleeve 1201. The reflective arm sleeve 1200 can have any or all of the general properties of the reflective articles of wear discussed above. For example, in aspects, the reflective arm sleeve 1200 can be comprised of an elastomeric material with retroreflective components embedded therein and having a plurality of apertures, such as that described above with reference to FIGS. 1-4.

In aspects, the reflective arm sleeve 1200 can include a plurality of apertures 1202. It should be understood that the pattern of the elastomeric material and of the apertures 1202 of the reflective arm sleeve 1200 is just one example, and that other patterns, sizes, and types of apertures are contemplated by the present disclosure.

In aspects, the reflective arm sleeve 1200 can be worn over another article of apparel, such as a shirt 1204. In such aspects, based on the elastomeric properties of the elastomeric material, the reflective arm sleeve 1200 can easily slide over the shirt 1204 and may be held in place at least partly due to the constrictive force applied by the elastomeric material around the arm of the wearer. In the same or alternative aspects, the reflective arm sleeve 1200 can include one or more reversible fasteners and the shirt 1204 can include complementary reversible fasteners, such as the reversible fasteners discussed above with respect to the garment system 1000 of FIGS. 10A-10D. In one aspect, the reflective arm sleeve 1200 can be worn by itself, e.g., not over another article of apparel.

Figure 13:
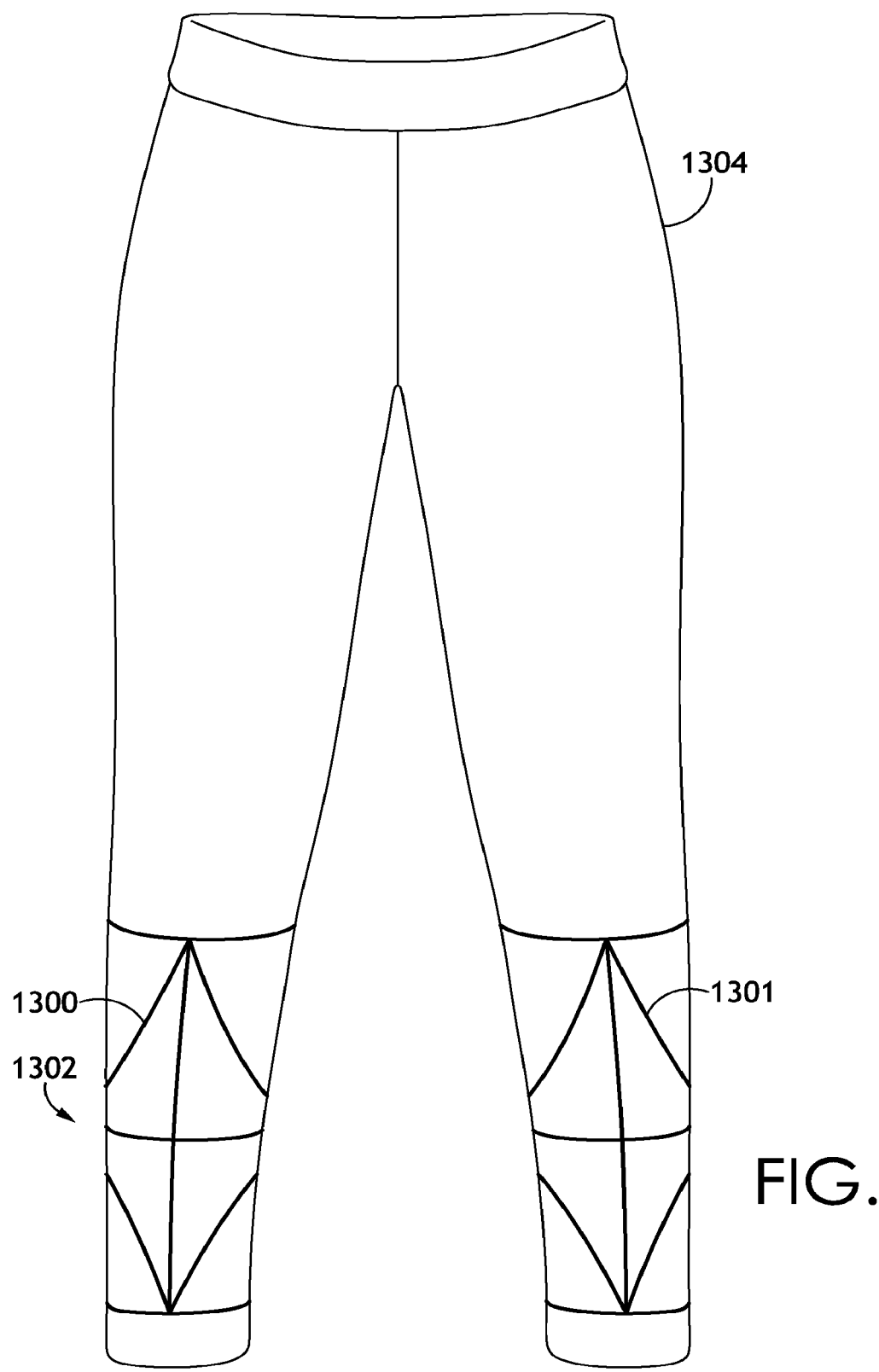
FIG. 13 is a front view of a lightweight reflective leg sleeve positioned on one leg of underlying pants and another lightweight reflective leg sleeve positioned on another leg of the underlying pants, in accordance with aspects hereof.

FIG. 13 depicts reflective leg sleeves 1300 and 1301. While the following description focuses on the leg sleeve 1300, it should be understood that this description also applies to the reflective leg sleeve 1301. In aspects, the reflective leg sleeve 1300 can be comprised of an elastomeric material with retroreflective components embedded therein and having a plurality of apertures, such as that described above with reference to FIGS. 1-4.

In the aspect depicted in FIG. 13, the reflective leg sleeve 1300 includes a plurality of apertures 1302. It should be understood that the pattern of the elastomeric material and of the apertures 1302 of the reflective leg sleeve 1300 is just one example, and that other patterns, sizes, and types of apertures are contemplated by the present disclosure.

FIG. 13 depicts the reflective leg sleeve 1300 positioned over pants 1304. In one aspect, the reflective leg sleeve 1300 can be secured in place at least partly from the constrictive force of the elastomeric material of the reflective leg sleeve 1300 when positioned around the leg of a wearer. In various aspects, reversible fasteners may be utilized to secure the reflective leg sleeve 1300 in place and removably couple the leg sleeve 1300 to the pants 1304, e.g., using similar reversible fasteners to those described above with respect to the garment system 1000 of FIGS. 10A-10D. In aspects, the reflective leg sleeve 1300 can be worn by itself, e.g., not over another article of apparel.

Figure 23:
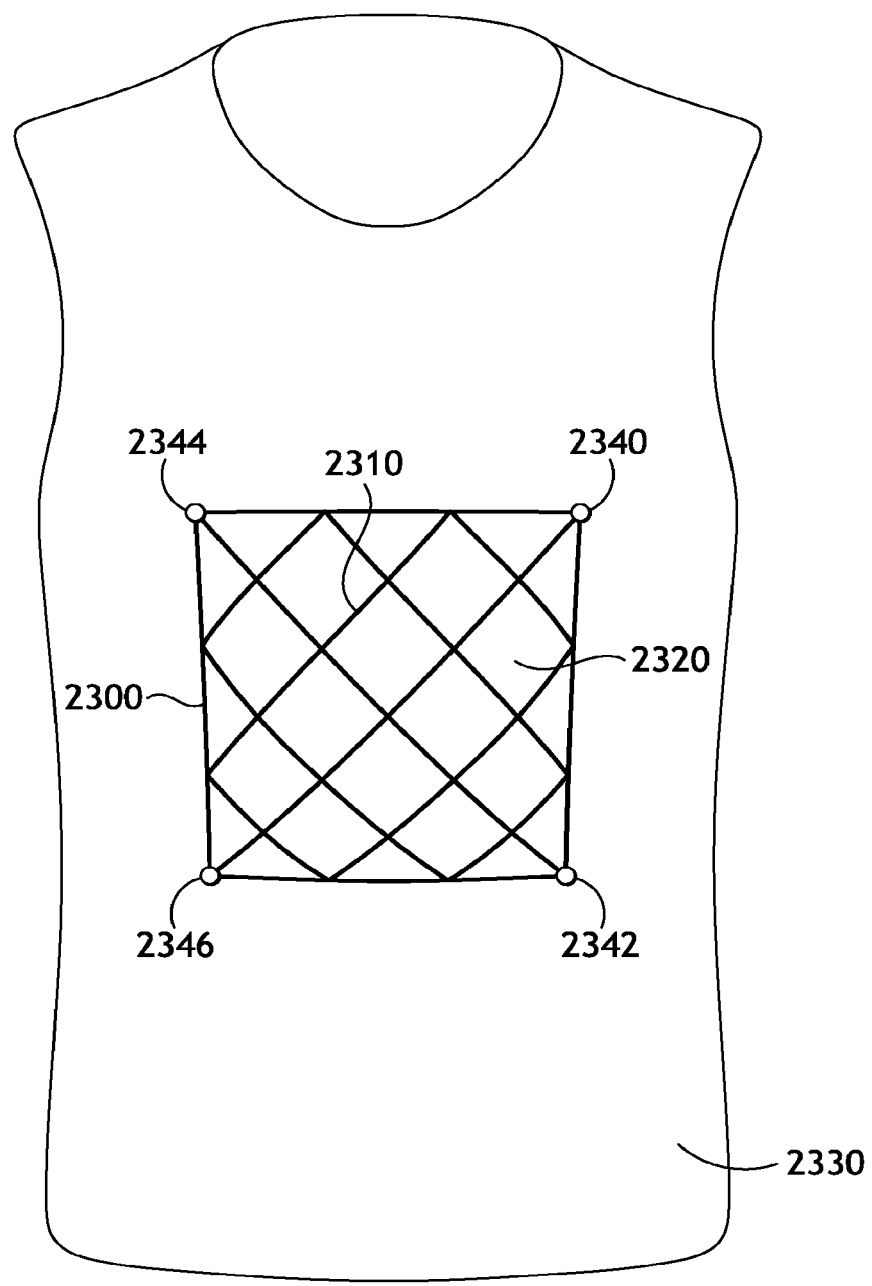
FIG. 23 is a perspective view of a different reflective article of wear positioned over an underlying shirt, in accordance with aspects hereof.

FIG. 23 depicts another aspect of a reflective article of wear in the form of a panel 2300. In aspects, the panel 2300 can include a pattern of strands of elastomeric material 2310 that define a plurality of apertures 2320. The elastomeric material and reflective components of the panel 2300 can include any or all of the properties for the same discussed above. It should be understood that the pattern of the elastomeric material 2310 and of the plurality of apertures 2320 of the panel 2300 is just one example, and that other patterns, sizes, and types of apertures are contemplated by the present disclosure. In certain aspects, the panel 2300 may be reversibly applied to a shirt 2330 via fasteners 2340, 2342, 2344, and 2346, such as the fasteners discussed above. As described above, the shirt 2330 and the panel 2300 may be provided as a system where the shirt 2330 may be provided with complementary fasteners (not shown) to the fasteners 2340, 2342, 2344, and 2346 on the panel 2300.

Figure 14A:
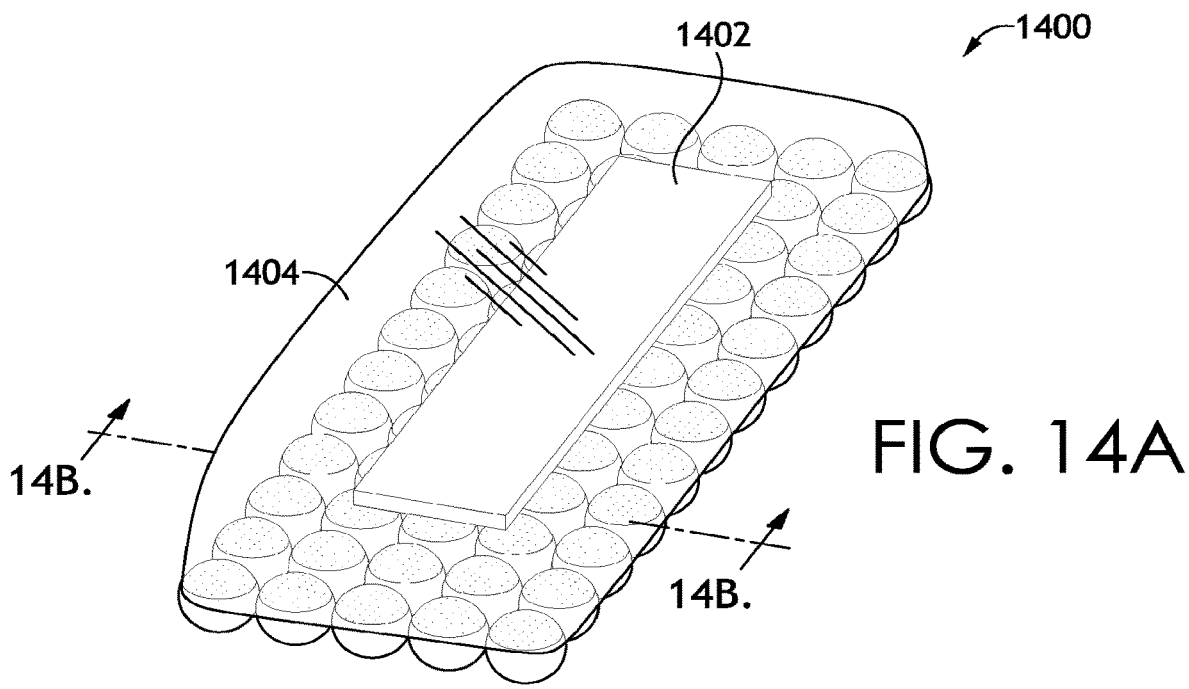
FIG. 14A is a perspective view of a portion of a reflective article of wear, particularly showing a light strip coupled to the reflective article of wear, in accordance with aspects hereof.
Figure 14B:
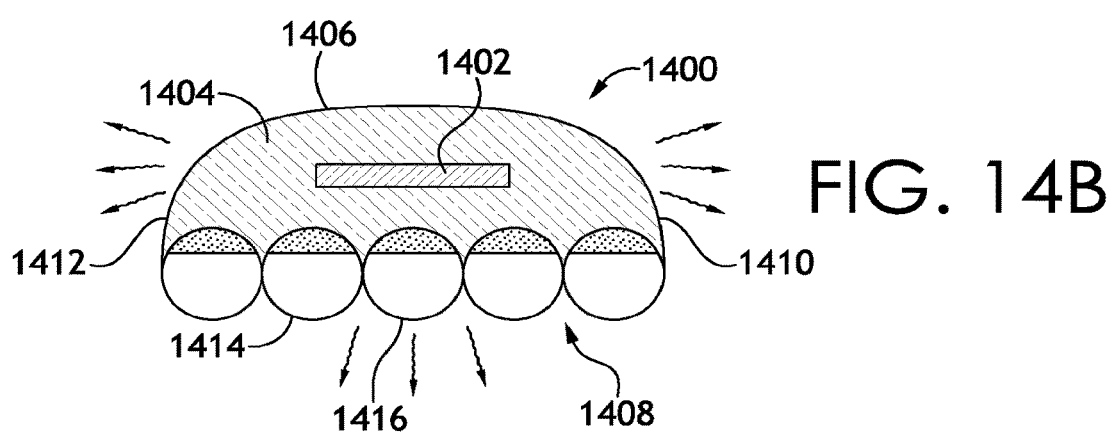
FIG. 14B is a cross-sectional and schematic view along the cutline 14B in FIG. 14A, particularly showing the light strip embedded within the elastomeric material.

As discussed above, it may be desirable to enhance the visibility of a wearer by incorporating one or more light sources into the reflective articles of wear described herein. For example, FIGS. 14A and 14B depict a portion of a reflective article of wear 1400 that includes an LED light strip 1402 embedded within elastomeric material 1404. In aspects, the LED light strip 1402 can be any type of LED light strip that is appropriately sized for the articles of wear disclosed herein. It should be understood that the LED light strip 1402 is just one example of a light source that can be utilized with the reflective articles of wear disclosed herein and that one skilled in the art can select other types of light sources for a specific purpose.

In certain aspects, the LED light strip 1402 can be coupled to the portion of the reflective article of wear 1400 while producing the article of wear. For example, in such aspects, the LED light strip 1402 can be placed on top of an uncured elastomeric material, e.g., the elastomeric material 1404. Further, in such aspects, after applying the LED light strip 1402 on top of uncured elastomeric material, an additional portion of elastomeric material can be place over the LED light strip 1402. Once the additional portion of elastomeric material is placed over the LED light strip 1402, the curing of the elastomeric material 1404 can secure the LED light strip 1402 in place, embedded within the elastomeric material 1404. This process of embedding LED light strips within the elastomeric material may be extended to other types of devices or objects such as, for instance, magnets, wires, conductive traces, and the like.

In one or more aspects, not depicted in the figures, a power source can be coupled to the LED light strip 1402 and be embedded within the elastomeric material 1404 along with the LED light strip 1402. Alternatively, the power source can be coupled to an outer portion of the elastomeric material 1404 or a portion of the reflective article of wear 1400. In such an aspect, a power wire or connection could be embedded within the elastomeric material 1404 and extend out of the elastomeric material 1404 for coupling to the power source. A specific configuration of coupling the LED light strip 1402 to a power source can be determined by one skilled in the art for a particular purpose.

As discussed above, in certain aspects, the reflective articles of wear disclosed herein can include a first surface and an opposing second surface, where retroreflective components can be coupled to the second surface, and where the first surface is in contact with a wearer when in an as-worn position. For example, as can be seen in FIG. 14B, the surface 1406 of the portion of the reflective article of wear 1400 can be in contact with a wearer when in an as-worn position, while the surface 1408 of the portion of the reflective article of wear 1400 can face outwards away from the wearer when in an as-worn position. In such aspects, a portion of the light emitted from the LED light strip 1402 can transmit light out the sides 1410 and 1412 of the portion of the reflective article of wear 1400, thereby illuminating a portion of the wearer. Further, in such aspects, a portion of light emitted from the LED light strip 1402 may pass through spaces between individual retroreflective components, e.g., retroreflective components 1414 and 1416, coupled to the surface 1408 of the portion of the reflective article of wear 1400.

In an aspect not depicted in the figures, one or more retroreflective components may not be present in front of the LED light strip 1402 in order to allow light from the LED light strip 1402 to transmit through the elastomeric material 1404 and out away from the surface 1408. For example, in certain aspects, when forming the reflective article of wear, areas within the reflective article of wear may be at least partly void of retroreflective components where a light source is to be embedded.

In certain aspects, as discussed above, the LED light strip 1402 may transmit light through the elastomeric material 1404 and out into the environment. In such an aspect, the elastomeric material 1404 may be transparent and/or clear. In the same or alternative aspects, the elastomeric material 1404 may refract a portion of the LED light emitted from the LED light strip 1402 so that the elastomeric material 1404 becomes illuminated. In one aspect, the elastomeric material 1404 can be chosen for a desired level of transparency and/or translucency in order to provide the desired level of transmission of the LED light outside of the elastomeric material 1404 and/or of the illumination of the elastomeric material 1404.

Figure 15A:
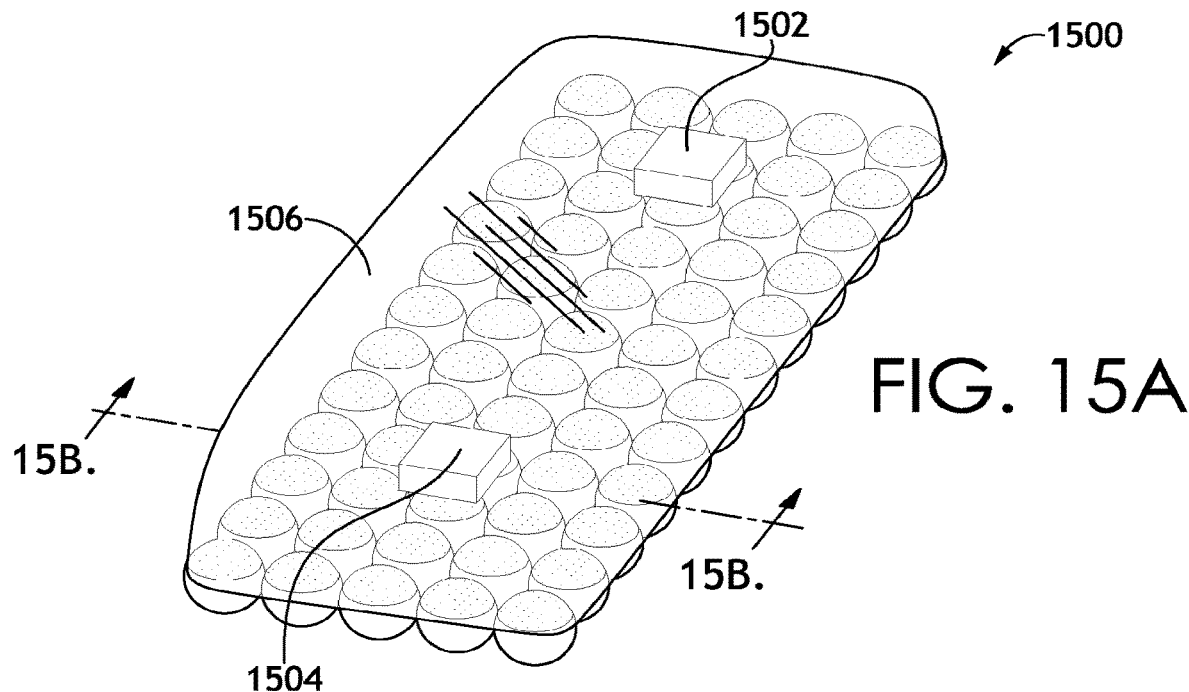
FIG. 15A is a perspective view of a portion of a reflective article of wear, particularly showing two light bulbs coupled to the reflective article of wear, in accordance with aspects hereof.
Figure 15B:
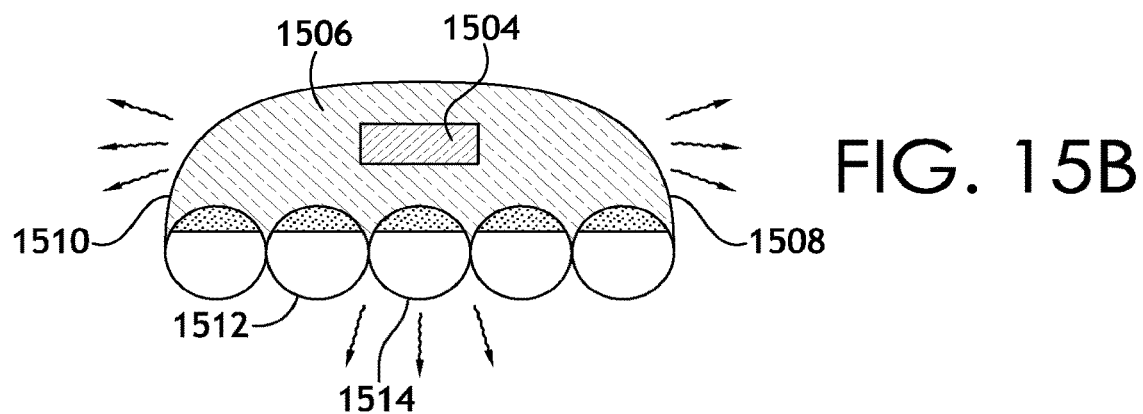
FIG. 15B is a cross-sectional and schematic view along the cutline 15B in FIG. 15A, particularly showing one of the light bulbs embedded within the elastomeric material, in accordance with aspects hereof.

FIGS. 15A and 15B depict another aspect where one or more light sources are coupled to a portion of a reflective article of wear 1500. As best seen in FIG. 15A, individual LED light bulbs 1502 and 1504 are positioned within the elastomeric material 1506 of the portion of the reflective article of wear 1500. The LED light bulbs 1502 and 1504 can be any type of available LED (commercial or otherwise) light bulbs that are sized for use within the articles of wear disclosed herein.

In aspects not depicted in the figures, a power source may be coupled to the LED light bulbs 1502 and 1504 and either embedded within the elastomeric material 1506 or coupled to an outer portion of the elastomeric material 1506, as similarly discussed above with reference to power sources for the LED light strip 1402 of FIGS. 14A and 14B.

FIG. 15B depicts a cross section of the individual LED light bulb 1504 embedded within the elastomeric material 1506. In aspects, the individual LED light bulb 1502 (and LED light bulb 1504) can be embedded within the elastomeric material 1506 when forming the portion of the reflective article of wear 1500, as discussed above with reference to the LED light strip 1402 of FIGS. 14A and 14B. Further, as discussed above with reference to the elastomeric material 1404 of FIGS. 14A and 14B, in certain aspects, a specific elastomeric material, e.g., the elastomeric material 1506 can be selected for the desired level of transparency and/or translucency to provide the desired illumination effects.

Further, in aspects, similar to the LED light strip 1402 of FIGS. 14A and 14B, the LED light bulbs 1502 and 1504 can transmit light out the sides 1508 and 1510 of the portion of the reflective article of wear 1500 to illuminate a portion of a wearer and/or out through spaces between individual retroreflective components, e.g., retroreflective components 1512 and 1514, to transmit light out away from a wearer.

Figure 15C:
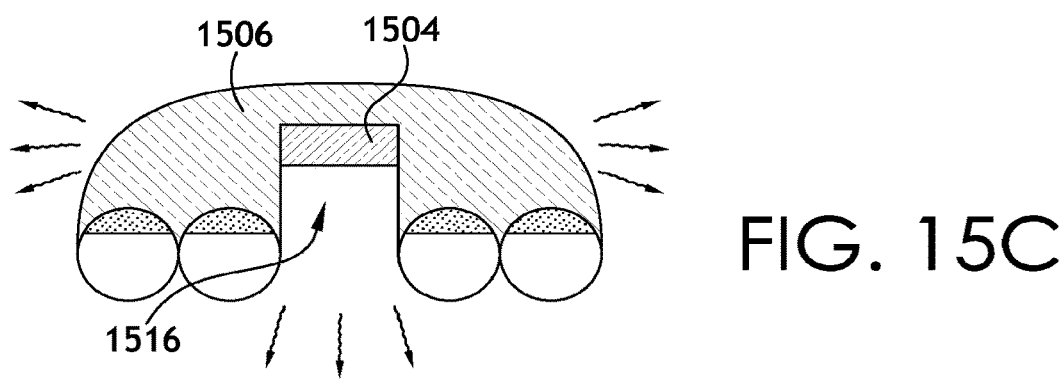
FIG. 15C is a cross-sectional and schematic view showing a light bulb embedded within an elastomeric material and a hole extending from the bulb through the elastomeric material, in accordance with aspects hereof.

In one alternative aspect, one or more holes or incisions within the elastomeric material 1506 can be present in order to direct light out from the LED light bulbs 1502 and 1504. For example, as can be seen in FIG. 15C, a hole 1516 can be formed in the elastomeric material 1506 to direct light from the light bulb 1504 out away from a wearer. In such an aspect, the hole can be formed during the initial formation of the portion of the reflective article of wear 1500 or as a post-production process.

Figure 16:
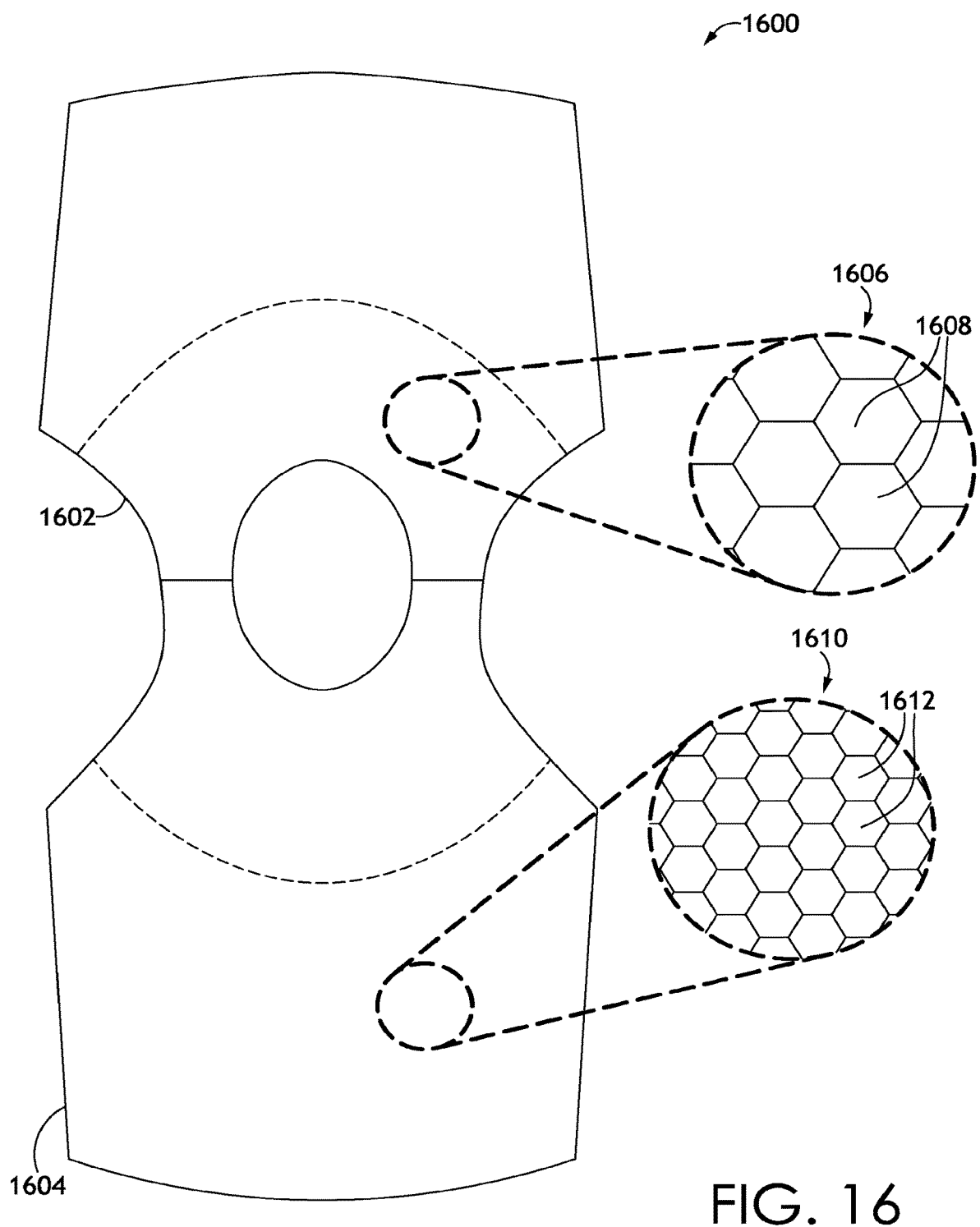
FIG. 16 is a plan view of a reflective vest showing different sized apertures in two different regions of the reflective vest, in accordance with aspects hereof.

As discussed above, in certain aspects, alternative patterns of the elastomeric material can be utilized to form reflective articles of wear. In such aspects, strands of elastomeric material can form different sized and/or differently shaped apertures to control the degree of breathability of the reflective articles of wear. For example, in aspects, one may desire to have larger apertures in regions where a wearer would have increased heat generation compared to another region not having the same level of heat generation. FIG. 16 depicts one aspect of a reflective vest 1600 with different sizes of apertures in different regions of the reflective vest 1600. The reflective vest 1600 can include any or all of the general properties of the reflective vest 100 and its associated components discussed above with reference to FIGS. 1-4. As can be seen in FIG. 16, the region 1602 of the reflective vest 1600 includes strands 1606 of an elastomeric material that form apertures 1608 that are larger than apertures 1612 formed from strands 1610 of an elastomeric material in the region 1604.

In the aspect depicted in FIG. 16, the patterns of apertures 1608 and 1612 can be a repeating pattern throughout the reflective vest 1600. In alternative aspects, the reflective vest 1600 can include different regions with differing sizes of apertures with a non-repeating pattern of apertures.

Although the reflective vest 1600 of FIG. 16, and the reflective vest 100 of FIGS. 1-4, are depicted as vests that would be donned by pulling the vest over the wearer's head, it is contemplated that the reflective vest 1600 and/or the reflective vest 100 may be formed in other manners such as one with completed arm holes and an opening extending along the front, which allows such a vest to be donned more like a zippered jacket or button-down shirt.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements or steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. An elastomeric reflective article of wear comprising:
a continuous webbed structure having a plurality of apertures, the continuous webbed structure comprising a plurality of intersecting reflective elastomeric strands forming:
a first side panel with a first armhole;
a second side panel with a second armhole; and
a central portion forming a back panel, the central portion continuously extending between the first side panel and the second side panel,
wherein a first aperture of the plurality of apertures is located on the central portion, the first aperture comprising:
a long axis that is oriented orthogonal to a hypothetical vertical axis, and
a short axis that is oriented parallel to the hypothetical vertical axis, wherein a first degree of deformation of the first aperture along the short axis is greater than a second degree of deformation of the first aperture along the long axis.

2. The elastomeric reflective article of wear of claim 1, wherein the plurality of intersecting reflective elastomeric strands comprise a plurality of glass beads, wherein each glass bead in the plurality of glass beads is partly coated with a reflective material.

3. The elastomeric reflective article of wear of claim 1, wherein at least a portion of the plurality of apertures comprise a quadrilateral shape.

4. The elastomeric reflective article of wear of claim 3, wherein the quadrilateral shape is a diamond shape.

5. The elastomeric reflective article of wear of claim 1, further comprising one or more light sources coupled to a portion of the continuous webbed structure.

6. The elastomeric reflective article of wear of claim 5, wherein the one or more light sources comprise one or more light-emitting diode (LED) lights.

7. The elastomeric reflective article of wear of claim 1, wherein the continuous webbed structure is formed in a flat configuration.

8. The elastomeric reflective article of wear of claim 1, further comprising one or more fasteners, wherein the one or more fasteners are useable to releasably couple the first side panel and to the second side panel.

9. The elastomeric reflective article of wear of claim 8, wherein the one or more fasteners are integrally formed with one or more of the first side panel and the second side panel.

10. The elastomeric reflective article of wear of claim 8, wherein the one or more fasteners comprise one or more of a slider mechanism, a hook and loop mechanism, a hook mechanism, and a magnetic mechanism.

11. An upper torso reflective garment comprising:
a webbed structure having a plurality of apertures, the webbed structure comprising a plurality of intersecting reflective elastomeric strands that form:
a first side panel with a first armhole;
a second side panel with a second armhole; and
a central portion forming a back panel, the central portion continuously extending between the first side panel and the second side panel, wherein a first number of intersecting reflective elastomeric strands in the plurality of intersecting reflective elastomeric strands configured to be located on a front torso of a wearer, when the upper torso reflective garment is in an as worn configuration is less than a second number of intersecting reflective elastomeric strands in the plurality of intersecting reflective elastomeric strands configured to be located on a back torso of the wearer, when the upper torso reflective garment is in the as worn configuration.

12. The upper torso reflective garment of claim 11, wherein the webbed structure is formed in a flat configuration.

13. The upper torso reflective garment of claim 11, further comprising one or more fasteners, wherein the one or more fasteners are useable to releasably couple the first side panel and to the second side panel.

14. The upper torso reflective garment of claim 13, wherein the one or more fasteners are integrally formed with one or more of the first side panel and the second side panel.

15. The upper torso reflective garment of claim 13, wherein the one or more fasteners comprise one or more of a slider mechanism, a hook and loop mechanism, a hook mechanism, and a magnetic mechanism.

16. A method for manufacturing a reflective article of wear, the method comprising:
providing a transfer sheet having a plurality of reflective components temporarily secured to a first surface of the transfer sheet;
positioning a second surface of the transfer sheet on a work surface;
extruding an elastomeric material onto a portion of the first surface of the transfer sheet in a pattern of interconnected strands to form a webbed structure comprising a plurality of apertures, wherein the webbed structure comprises a first side panel, a back panel, and a second side panel;
curing the elastomeric material forming the webbed structure, wherein the curing causes the plurality of reflective components on the first surface of the transfer sheet to become embedded within the elastomeric material of the webbed structure; and
removing the transfer sheet from the webbed structure.

17. The method of claim 16, wherein the curing is done by applying heat.

18. The method of claim 17, wherein the work surface is a heated flat bed, and wherein the heat is applied by the heated flat bed.

19. The method of claim 16, wherein the plurality of reflective components comprise a plurality of retroreflective beads, wherein each retroreflective bead in the plurality of retroreflective beads comprises a reflective material on a first portion of an outer surface of the each retroreflective bead, wherein the first portion is opposite to a second portion of the outer surface of the each retroreflective bead that is temporarily secured to the transfer sheet.

20. The method of claim 16, wherein each aperture in the plurality of apertures of the webbed structure comprises a shape having a first axis and a second axis.

\* \* \* \* \*

UNITED STATES PATENT AND TRADEMARK OFFICE
CERTIFICATE OF CORRECTION

| | | |
|---|---|---|
| PATENT NO. | : 11,297,885 B2 | Page 1 of 1 |
| APPLICATION NO. | : 16/691153 | |
| DATED | : April 12, 2022 | |
| INVENTOR(S) | : Morgan et al. | |

It is certified that error appears in the above-identified patent and that said Letters Patent is hereby corrected as shown below:

On the Title Page

• Item (63) Column 1, Line 2: Delete "2017." and insert -- 2018. --.

In the Specification

• Column 8, Line 46: Delete "1," and insert -- l, --.
• Column 8, Line 47: Delete "1," and insert -- l, --.
• Column 8, Line 48: Delete "1." and insert -- l. --.

In the Claims

• Column 26, Line 7: In Claim 11, delete "configuration" and insert -- configuration, --.

Signed and Sealed this
Fifth Day of July, 2022

Katherine Kelly Vidal
*Director of the United States Patent and Trademark Office*